US012067110B2

United States Patent
Gligor et al.

(10) Patent No.: US 12,067,110 B2
(45) Date of Patent: Aug. 20, 2024

(54) METHOD AND APPARATUS FOR ESTABLISHING A SOFTWARE ROOT OF TRUST ON AN UNTRUSTED COMPUTER SYSTEM

(71) Applicant: CARNEGIE MELLON UNIVERSITY, Pittsburgh, PA (US)

(72) Inventors: Virgil D. Gligor, Pittsburgh, PA (US); Shan Leung Woo, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 379 days.

(21) Appl. No.: 17/426,519

(22) PCT Filed: Jan. 24, 2020

(86) PCT No.: PCT/US2020/015017
§ 371 (c)(1),
(2) Date: Jul. 28, 2021

(87) PCT Pub. No.: WO2020/167448
PCT Pub. Date: Aug. 20, 2020

(65) Prior Publication Data
US 2022/0108006 A1    Apr. 7, 2022

Related U.S. Application Data

(60) Provisional application No. 62/918,822, filed on Feb. 14, 2019.

(51) Int. Cl.
G06F 21/00 (2013.01)
G06F 21/54 (2013.01)
G06F 21/57 (2013.01)

(52) U.S. Cl.
CPC .............. *G06F 21/54* (2013.01); *G06F 21/57* (2013.01); *G06F 21/575* (2013.01); *G06F 2221/034* (2013.01)

(58) Field of Classification Search
None
See application file for complete search history.

(56) References Cited

U.S. PATENT DOCUMENTS 8,627,414 B1   1/2014  McCune et al.
9,177,153 B1 * 11/2015  Perrig ...................... G06F 21/57
9,747,458 B2 *  8/2017  Jakobsson ............. H04L 9/3236
(Continued)

OTHER PUBLICATIONS

Ezzeddome, Mazen; Akkary, Haitham. Issues in Trustworthy Software Systems. 2015 IEEE Trustcom/BigDataSE/ISPA. https://ieeexplore.ieee.org/stamp/stamp.jsp?tp=&arnumber=7345403 (Year: 2015).*
Liu, Xiao et al. A Trust and Priority Based Code Updated Approach to Guarantee Security for Vehicles Network. IEEE Access, vol. 6. https://ieeexplore.ieee.org/stamp/stamp.jsp?tp=&arnumber=8478147 (Year: 2018).*

(Continued)

*Primary Examiner* — Jeremiah L Avery
(74) *Attorney, Agent, or Firm* — KDW Firm PLLC

(57) ABSTRACT

A method and apparatus for establishing a software root of trust (RoT) ensures that the state of an untrusted computer system contains all and only content chosen by an external verifier and the system code begins execution in that state, or that the verifier discovers the existence of unaccounted for content. The method enables program booting into computer system states that are free of persistent malware such that an adversary cannot retain undetected control of an untrusted system.

20 Claims, 11 Drawing Sheets

(56) References Cited

U.S. PATENT DOCUMENTS

| | | | |
|---|---|---|---|
| 2005/0108564 A1 | 5/2005 | Freeman et al. | |
| 2012/0260345 A1 | 10/2012 | Quinn et al. | |
| 2012/0266252 A1* | 10/2012 | Spiers | H04L 9/3247 |
| | | | 726/26 |
| 2014/0258700 A1 | 9/2014 | England et al. | |
| 2015/0052616 A1* | 2/2015 | Hutchison | G06F 3/0632 |
| | | | 726/27 |
| 2017/0048714 A1* | 2/2017 | Attfield | H04L 63/0853 |
| 2017/0228731 A1* | 8/2017 | Sheng | G06Q 20/36 |
| 2017/0364450 A1* | 12/2017 | Struttmann | H04L 9/3297 |
| 2018/0089425 A1* | 3/2018 | Trikalinou | G06F 21/70 |
| 2018/0191503 A1* | 7/2018 | Alwar | H04L 9/3242 |
| 2018/0307857 A1* | 10/2018 | Beecham | G06F 16/9024 |
| 2020/0004993 A1* | 1/2020 | Volos | G06F 21/577 |

OTHER PUBLICATIONS

Rubinov, Konstantin et al. Automated Partitioning of Android Applications for Trusted Execution Environments. 2016 IEEE/ACM 38th International Conference on Software Engineering (ICSE). https://ieeexplore.ieee.org/stamp/stamp.jsp?tp=&arnumber=7886968 (Year: 2016).*

International Search Report and Written Opinion for International Patent Application No. PCT/US2020/015017 mailed on Apr. 20, 2020, 10 pages.

Gligor et al., "Establishing Software Root of Trust Unconditionally." In: NDSS. Nov. 7, 2018. Retrieved on Mar. 24, 2020. Retrieved from URL: <https://www.cylab.cmu.edu/_files/pdfs/tech_reports/CMUCylab18003.pdf>, 27 pages.

* cited by examiner

METHOD AND APPARATUS FOR ESTABLISHING A SOFTWARE ROOT OF TRUST ON AN UNTRUSTED COMPUTER SYSTEM

RELATED APPLICATIONS

This application is a national phase filing under 35 U.S.C. § 371 claiming the benefit of and priority to International Patent Application No. PCT/US2020/015017, filed on Jan. 24, 2020, which claims the benefit of U.S. Provisional Patent Application No. 62/918,822, filed Feb. 14, 2019. The contents of these applications are incorporated herein in their entirety.

FIELD OF THE INVENTION

The present invention relates generally to secure computer systems and, particularly, to establishing malware-free, root of trust (RoT), and secure states before booting trustworthy programs.

BACKGROUND

It is generally accepted that it is beneficial for trustworthy programs, such as a formally verified micro-kernel or a micro-hypervisor, to be booted into a system state of a computer system. The system state comprises the contents of all processor and I/O registers and random-access memories of a chip set, board devices, and peripheral device controllers at a particular time (e.g., before boot). If any malicious software (often referred to as "malware") can execute instructions anywhere in the system state, a verifier that performs the booting operation will discover the presence of such malware with high assurance.

This goal has not been achieved to date by any verifier. System components that are not directly addressable by central processing unit (CPU) instructions or by trusted hardware modules enable malware to survive in non-volatile memories despite repeated power cycles, secure and trusted boot operations. As such, it is said that the malware becomes persistent.

For example, persistent malware has been found in the firmware of peripheral controllers, network interface cards, disk controllers and USB controllers, as well as in routers and firewalls. Persistent malware can infect the rest of the system state, and, as such, a remote adversary can retain long-term undetected control of a user's local system.

It is also generally considered beneficial for a verifier to initialize the local system state to chosen content (e.g., malware-free code), or I/O register values indicating that the system is disconnected from the Internet. Then, the verifier can check that the state of the system, which may have been infected by malware and, hence, is un-trusted, has been initialized to the chosen content.

Root of trust (RoT) establishment on an untrusted system ensures that a system state comprises all and only content chosen by the user, and the user's code begins execution in that state. "All" implies that no content is missing, and "only" implies that no extra content exists. If a system state is initialized to content that satisfies security invariants and RoT establishment succeeds, a user's code begins execution in a secure initial state. Then, trustworthy OS programs booted in a secure initial state can extend this state to include secondary storage and temporarily attached (e.g., USB) controllers. If RoT establishment fails, unaccounted for content, such as malware, exists. Hence, RoT establishment is sufficient for ensuring malware freedom and necessary for all software that needs a secure initial state, such as access control and cryptographic software. However, as with a secure and trusted boot, the trustworthiness of the software booted in their secure initial states is not a RoT establishment concern.

Prior attestation protocols, whether software-based, cryptographic-based or hybrid, fail to establish RoT, as they establish the integrity of system software, not system state. For example, these protocols need not be concerned with the content of system registers (e.g., general processor, status, configuration, and I/O registers), because they cannot contain executable code. Also, they do not establish any system state properties of multi-device untrusted systems, such as secure initial state. Furthermore, none establishes RoT provably and unconditionally.

More specifically, all software-based attestation approaches fail to prove the space-time optimality of their checksum functions and fail to establish control-flow integrity of the verifier protocol, both of which are critical requirements for RoT establishment. A more subtle shortcoming is that traditional checksum designs cannot scale time bounds in multi-device untrusted systems by repeated checksum invocation with different nonces and retain optimality. Software-based attestation models also have this shortcoming.

Cryptographic protocols for remote attestation typically require a trusted hardware module in each device. Furthermore, to be used in RoT establishment, signature or MAC computations must verifiably establish control-flow integrity, which currently known methods fail to provide. More importantly, cryptographic attestation relocates the root of trust to third parties whose trustworthiness cannot be determined (i.e., parties who install the cryptographic keys in each board management unit or peripheral controller device and those who distribute them to verifiers). Thus, these protocols can offer only conditional security that cannot be proved secure.

To date are no methods that establish a RoT provably and unconditionally, and no other software security problem that has been solved unconditionally in any untrusted system. Therefore, it would be desirable to define a method for RoT establishment and an apparatus for establishing RoT provably and unconditionally on untrusted systems comprising of multiple CPUs and memories, board management unit devices, and device controllers.

SUMMARY OF THE INVENTION

This invention establishes a RoT unconditionally. The RoT is established without secrets, trusted hardware modules and special instructions, or polynomial bounds on an adversary's computing power. By definition, a solution to a security or cryptography problem is unconditional if it depends only on the existence of physical randomness and the ability to harvest it. It is generally recognized that unconditional security solutions have several fundamental advantages over conditional ones. In particular, they are independent of any security mechanism, protocol, or external party whose trustworthiness is uncertain (e.g., a mechanism that uses a secret key installed in hardware by a third party depends on the unknowable ability and interest of that party to protect key secrecy), they limit any adversary's chance of success to provably low probabilities determined by the defender (i.e., they give a defender undeniable advantage over the adversary) and they are independent of the adversary's computing power and technology used (e.g., they are useful in post-quantum computing).

The present invention is generally directed to the establishment of a root-of-trust (RoT) by trusted verifiers on untrusted systems, which are predominantly but not exclusively commercially available, comprising processors and memories, board management units, and device controllers, each of which includes at least one central processing unit and primary memory. One distinctive feature of the present invention is that it can operate without any secrets, trusted hardware modules and instructions, or bounds on an adversary's computational power. Although it is not required by the present invention, one embodiment of the present invention uses stored secrets that are protected within boards or controllers or in trusted hardware modules. In these cases, the adversary computational power can be bounded by cryptographic analyses and trust is only conditional, which is well-known to those skilled in the art.

For RoT establishment, a verifier device uses a commonly available source of non-secret randomness, such as one of the many commercially available quantum random number generators. It also uses a specification of the untrusted system, which comprises the system's chipset, board devices, and device controllers, each having their own processors with their own instruction set architectures (ISAs). All processors have general ISAs that include memory transfer, arithmetic and logic, shift/rotate, branching, and I/O instructions and multiple addressing modes. They can also support pipelining, multiprocessors or multicores, caches, and virtual memory.

RoT is established by a trusted local verifier device, hence-forth called the verifier, connected to an untrusted system. In its simplest embodiment, the untrusted system has a single device comprising a processor with register set R and a random-access memory M. The verifier asks the device to initialize M and R to chosen content. Then the verifier executes a simple challenge-response protocol that sends a random nonce, which selects $C_{nonce}$ from a family of computations $C_{m,t}$(M, R) with space and time bounds m and t, and challenges the device to execute computation $C_{nonce}$ on input (M, R) in m words and time t. Note that $C_{m,t}$ is space-time (i.e., m–t) optimal and second pre-image free, the result $C_{nonce}$(M R) is unpredictable by an adversary, and $C_{nonce}$ is non-interruptible.

Then the device responds to the challenge by outputting result $C_{nonce}$(M, R) in time t to the verifier. After accounting for the local communication delay, the verifier concludes that the device state (M, R) contains all and only the chosen content. If the response of the system is incorrect or untimely, the verifier concludes that the RoT is not established. The verifier's decision is based on the fact that the second pre-image freedom and m–t optimality jointly ensure that fewer than m words or less time than t, or both, cannot be used to leave unaccounted for content (e.g., malware) or executing arbitrary code in the device. When an untrusted system comprises multiple board devices and peripheral device controllers, the verifier's challenge-response protocol ensures that a board or controller devices cannot help each other to undetectably circumvent its bounds by executing some part of the computation.

In the current invention, an adversary can exercise all known attacks that insert persistent malware into an untrusted computer system's boards and controller devices. The adversary can have brief access to that system's components and corrupt software and firmware (e.g., an extensible firmware interface (EH) attack). Also, the adversary can control malware remotely and extract all software secrets stored in the system via a network channel. Malware can read and write the verifier's local I/O channel but does not have access to the verifier's device and source of true random numbers. Furthermore, the adversary can break all complexity-based cryptography but the adversary malware cannot predict the true random numbers received from the verifier. Also, it can optimize or change the $C_{m,t}$ code on-the-fly on the untrusted system (e.g., without being detected by the verifier).

The inventive method is based on a new computation primitive $C_{m,t}$ with optimal space-time (m–t) bounds in adversarial evaluation on untrusted devices where the bounds can scale to larger values. Separate instances of these computations run on each untrusted system device. The new primitive is a randomized polynomial, which has k-independent uniform coefficients in a prime order field. The optimal evaluation bounds give randomized polynomials stronger collision properties than those of k-independent (almost) universal hash functions when evaluated on common computer systems. The use of randomized polynomials assures deterministic time measurement by verifiers on typical computer devices.

It is therefore a principal object of the present invention to connect a verification device (the verifier) to an untrusted system comprising a plurality of devices, each comprising processors and memories, for the purpose of establishing RoT. The verifier is connected to an interconnection (bus) system, which allows the verifier to communicate reliably with all untrusted system devices and can be physically attached to and removed from this system, or it can be permanently attached.

It is another object of this invention for the verifier to initialize each untrusted system device with a separate provably space-time optimal computation, and then to perform a challenge-response protocol concurrently with each device such that no device can help another undetectably circumvent its optimal bounds by executing some part of the latter computation.

It is another specific object of this invention for the execution of the verifier's challenge-response protocol with an untrusted system device to verifiably satisfy the control-flow integrity of the protocol code execution on that device, and that this protocol includes the execution of a separate space-time optimal computation for that device.

It is another particular object of this invention that the separate space-time optimal computation executing on a device be a randomly chosen instance of a k-independent (almost) universal hash function by the verifier. In a common embodiment, the verifier uses a random number generator to make its random choice. In another embodiment of this invention the random number generator is a quantum random number generator. Although not required by the present invention, yet another embodiment of the present invention uses software random number generator that executes instructions in the verifier device.

It is a further object of this invention that k-independent (almost) universal hash function retain its provable space-time optimality when executed by an adversary malware on an untrusted-system device.

It is a further specific object of this invention for the optimal space-time bounds of the k-independent (almost) universal hash function instance to be scalable to larger bound values.

It is a further particular object of this invention that the verifier can reliably measure the accuracy of the response received from the computation of the k-independent (almost) universal hash function on an untrusted system device, both in terms of the result correctness and timeliness.

In a preferred embodiment of this invention, separate k-independent (almost) universal hash functions are implemented using randomized polynomials. Their memory size is constant for constant k, are second pre-image free, and have coefficients comprising d+1 log p-bit words independent of k (i.e., degree d polynomials over a field of prime order p with k-independent, uniformly distributed coefficients and uniformly random input x.

Another object of the current invention is to include or be embodied as computer-readable instructions such as software, firmware, hardware and other embodiments which when executed by a processor, cause the processor to perform certain actions according to the present invention. In one embodiment, the present invention includes an apparatus including a processor memory, an input device and an output device, and the memory includes computer readable instructions, which, when executed, cause the processor to perform the methods described herein.

In summary, the present invention establishes a RoT on untrusted systems and enables them to withstand attacks from the most powerful adversary known to date. The present invention establishes the malware-free stales or individual untrusted system devices. The present invention can be used, for example, on commodity untrusted systems and devices, sensitive high-value applications such as enterprise systems, command and control systems, cryptographic processors, financial transactions, forensic analyses, in the presence of adversary malware and malicious insider attacks.

The foregoing has outlined some of the more pertinent objects of the present invention, which are merely illustrative of some of the more relevant applications and features of the invention. Many other variations are possible with the present invention, and those and other teachings, variations, and advantages of the present invention will become apparent from the flowing detailed description of the figures and the invention.

BRIEF DESCRIPTION OF THE DRAWINGS

Embodiments or the present invention will now be described, by the way of examples only, with reference to the accompanying drawings for the purpose of illustrating the embodiments, and not for the purpose of limiting the invention.

DETAILED DESCRIPTION OF THE INVENTION

Figure 1:
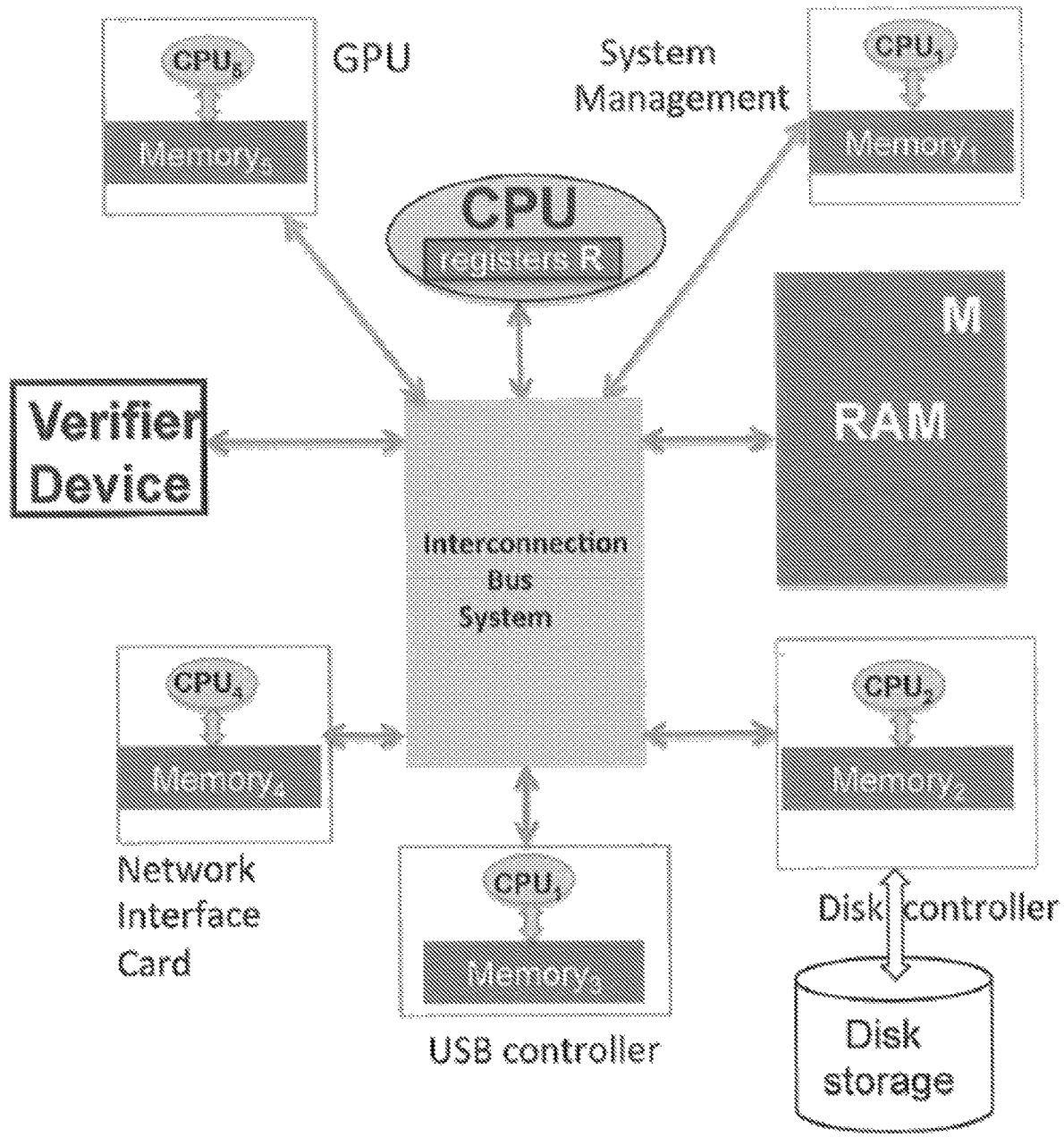
FIG. 1 illustrates one embodiment of the present invention in which a computer comprising multiple devices is connected to a verification device via an interconnection bus system.

FIG. 1 illustrates one embodiment of the computer system connected to a verifier device according to the present invention. In this embodiment, the computer system includes a processor (CPU), memory (RAM), a system management unit (SM), a disk controller (DC), a USB controller (USB), a network interface card (MC), and a GPU. The RAM includes computer-readable instructions that can cause the CPU to perform certain functions similar to the ones found in commodity processors and described herein. Although this embodiment illustrates the verifier device as being a separate device external to the computer system, the verifier device can, in other embodiments, be implemented as part of the computer system, for example as part of the system management device. The CPU receives and gives signals to the other devices of the computer system such as the verifier device. The CPU may have many variations. For example, it may include local instruction and data cache devices, may be pipelined, may include multiple execution cores, and may perform virtual address translation for virtual memory support. The computer system may have a single CPU or several CPUs, and each CPU may have multiple processing cores. The RAM memory may also have many variations. For example, it may be integrated with the CPU or may be separate, it may include one or more memory devices, it may be volatile or non-volatile such as flash memory, it may have a memory cache. Other combinations and variations of memory functions may be used with the present invention. In one embodiment, every device attached to the computer system comprises a processor or more, and a memory unit or more. Each device memory unit may include one or more memory devices, it may be volatile or non-volatile such as flash memory, and it may have a memory cache.

In one embodiment of the current invention, computer devices are connected together via a bus interconnection system. Each device communicates with every other device via the bus system in a manner that is not controlled or mediated by any other device attached to the system. For example, device to device communication may take the form of peer-to-peer input-output transfers that are not mediated by any other system device or hardware module. The system bus may comprise, for example, multiple buses connected via high speed bridges, or may be high-speed interconnection networks. In another embodiment of the present invention, the bus system may comprise a single bus that connects a verifier device directly to a single device. In other embodiments, the single device is a micro-controller of a real-time control unit. The interconnection bus system may a wired network, such as an electrical or optical network. The verifier device communicates separately with each device connected to the interconnection system bus by sending and receiving signals to it via the system bus. From the perspective of the verifier device, each device that is connected to the system bus is an endpoint with which the verifier device can communicate directly. In another embodiment, the bus system may allow communication between any two device endpoints, and it may authenticate the communication itself.

The present invention has many embodiments. For example, it may be an embedded system such as a system on a chip. In another embodiment, the present invention may comprise one or more devices located in one or more parts of the invention illustrated in FIG. 1. For example, the present invention may be embodied as computer-readable instructions (e.g., software on a chip, software in a portable or integrated memory device, hardwired instruction embodied into a hardware device, or other variations). The computer-readable instructions may be stored in non-volatile memory devices which may be integrated or embedded into another device or which may be removable and portable. Other variations and embodiments are also possible.

Figure 2:
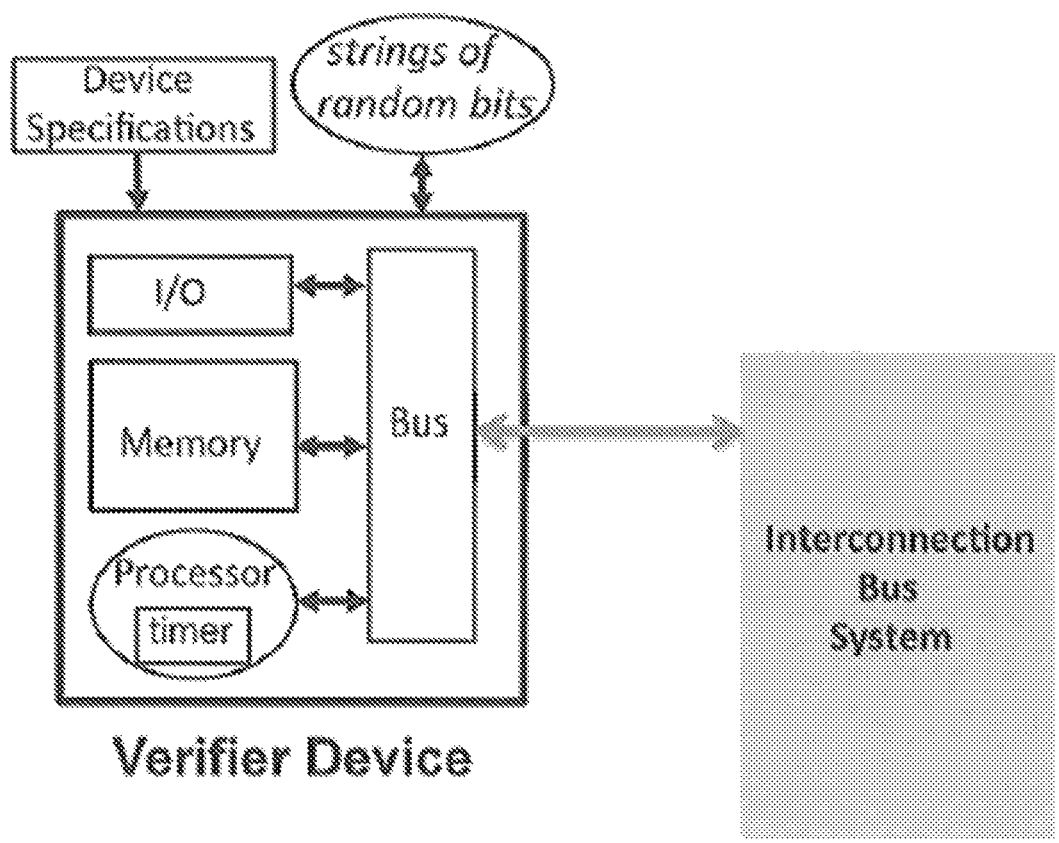
FIG. 2 illustrates an embodiment of the or the present invention in which a verifier device processes a string of random bits, interacts with system devices, and stores and displays the results of the interaction.

FIG. 2 illustrates one embodiment of a verifier dev ice in accordance with the present invention. The verifier device includes a memory, a processor that includes a granular timer, and a local input-output unit, all of which are connected via a local bus system. The local bus system connects the input-output unit to an external (true) random number generator that supplies a string of truly random bits to the memory and processor of the verifier device. The input-output unit inputs the strings or random bits and stores them into the verifier device memory for further processing as presented herein. The verifier device formats the strings of random bits into random numbers that fit into the memory and register words of the system devices to which the verifier device connects. In another embodiment, the true random number generator is part of the verifier device, rather than an external device, and its output is connected directly to the memory of the verifier.

In another embodiment of the present invention, the computing power of the adversary is limited and as such, the strings of random bits may be generated internally by a trusted pseudo-random number generator program whose instructions are stored in the memory of the verifier device. A short input string of random bits that comprise a random seed used by the pseudo-random number generator is input into the processor of the verifier device. In one embodiment, the seed is input by the user. In another embodiment, the seed is generated internally by the verifier hardware and software.

As customary in the state of the art, the string of random bits and random numbers generated in the verifier are not released outside the trusted verifier prior to their use in the random nonce and its release to a system device as described herein.

In one embodiment the input-output unit also connects the verifier device with an external display and software keyboard such as those of a smart phone. The local bus system also connects the verifier device to the interconnection bus system which allows the verifier device to communicate directly with each and every one of the system devices, as shown in FIG. 1. The verifier device connection to the rest of the system is not mediated by any other system device, such as a USB controller or a network interface card. In one embodiment, the verifier device is small, simple and portable. The processor of the verifier device includes a timer that enables the verifier to time its interaction with each system device, and performs certain additional functions described herein. The verifier device may have a single processor or several processors, and each processor may have multiple processing cores. The memory of the verifier device can be any form of non-volatile computer-readable memory and may store information on different media such as electrical, magnetic, and optical. It may also include multiple memory devices.

The verifier device includes a list of devices and their specification in other parts of the computer system with which the verifier can communicate. Each device specification includes the type of processors the device uses including the CPU model, clock speed, and memory latency. The processor specification also includes the CPU's instruction set architecture, number and types of processor registers and their functions (e.g., special processor registers, general purpose registers, input-output registers), caches and cache configurations, translation look-aside buffers (TLBs) for virtual memory addressing, pipelining and SIMD execution of memory instruction streams. Each device specification also includes device initialization programs and data which the verifier device sends to the system device. Also, each specification includes the description or the input data the verifier device sends to the initialized device programs and the expected correct response from those programs, which include both a program result and the time it takes to compute the result on the device. The initialization programs include the input-output instruction code the device uses to receive the input data and send the results back to the verifier. It also includes the data that initialize the registers of the device's processors. Other specifications and specification variations are possible in different embodiments.

The verifier device may or may not permit device specifications to be added to, deleted from or modified on the list of devices it stores. For example, in one embodiment the verifier device allows updates to be made to the endpoint system devices, such as the addition or deletion of a USB controller to the system. In another embodiment, the verifier device is read-only to reduce the risk of it being compromised. Yet in another embodiment, the verifier device is connected to a single endpoint device and hence it includes a single device specification.

In one embodiment, the input-output unit also connects the verifier device with an external user LED display and software keyboard. In other embodiments, the verifier device may include a full video display and hardware keyboard or mouse. These devices implement a human-perceptible interface to the operation of the verifier device. In one embodiment, this interface enables a human operator to activate the verifier device and display the result of its interaction with a system device or more as it takes place in real time. Both positive and negative results of the interaction may be displayed. In another embodiment, the results of the interaction are stored in the memory of the verifier device and displayed to the user at a later time, after the interaction terminates. Other variations for the display of the interaction are possible.

Figure 3:
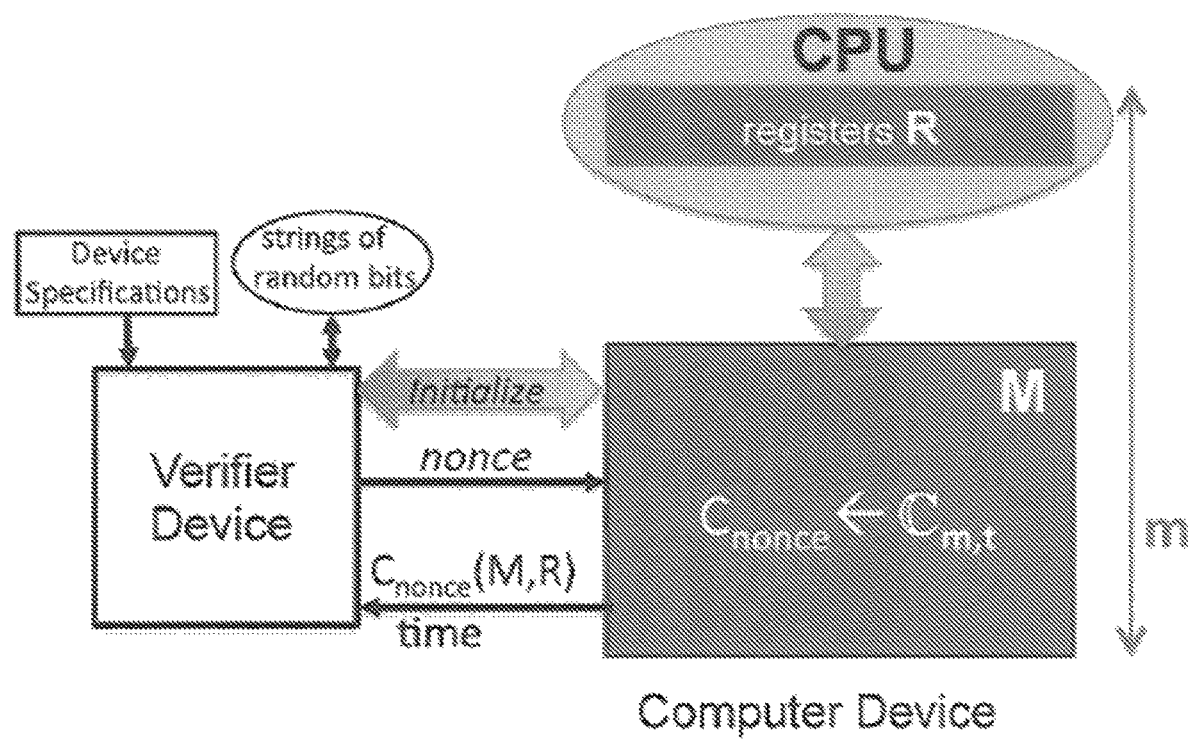
FIG. 3 illustrates another embodiment of the of the present invention in which a verifier device interacts with a single computing device using a space-time optimal, second pre-image free computation.

FIG. 3 illustrates one embodiment of how the verifier device interacts with a single system device to establish a RoT on the system device after the device is initialized according to one embodiment of the current invention. The verifier device interaction begins, in this embodiment, with the device initialization step whereby the device initialization programs and data arc sent to a system device by the verifier. The device initialization content, which is specified in the discussion of FIG. 2, includes a program whose instructions execute a computation $C_{m,t}$ in memory M and the register initialization data in the CPU registers R (i.e., programs $C_{m,t}(M, R)$). The verifier uses a $C_{m,t}$ program with concrete (i.e., non-asymptotic) space-time (m–t) optimal bounds on the system device processor and memory (i.e., on the CPU's instruction set architecture, register set, caches, TLB's, and for I/O and interrupts, multiprocessors, pipelining). The $C_{m,t}$ program is also second pre-image free. In other embodiments, the device initialization is performed prior to the device interaction with the verifier.

Those of skill in the art will recognize that the upper time and space bounds of a computation are given by an algorithm for that computation whereas the lower bounds are given by a proof that holds for all possible algorithms for it. Those of skill in the art also know that an algorithm is space-time optimal if its bounds match the space and time lower bounds of its computation, and that second pre-image freedom means that no adversary can find other memory or register contents, or both, that differ from the given ones, namely M'≠M or R'≠R, or both, such that $C_{m,t}(M', R') \neq C_{m,t}(M, R)$.

The untrusted computer device receives the random nonce from the verifier device, and uses the random nonce to select the instructions or the initialized $C_{m,t}$ program to execute (i.e., it selects the instructions $C_{nonce}$ from the program $C_{m,t}$ that executes instructions over the device memory M and CPU registers R (i.e., from $C_{m,t}(M, R)$). This step denotes the selection of program $C_{nonce}$ from the family of programs $C_{m,t}(M, R)$. Then the device CPU executes instructions $C_{nonce}$ over device memory M and CPU registers R and sends the result $C_{nonce}(M, R)$ back to the verifier device. After accounting for the interconnection bus delay, the verifier device measures the time it took for the $C_{nonce}$ program to execute on the untrusted computer device. If this time equals optimal time bound t, the verifier checks the correctness of the result $C_{nonce}(M, R)$ received from the system device. The verifier is trusted to obtain the correct result $C_{nonce}(M, R)$ from the execution of $C_{nonce}$ on a trusted computer, or equivalently, a trusted simulator of the trusted computer, having the same configuration as the untrusted compute r device. Also, optimal time bound t may vary among different computer systems embodiments as discussed herein, and hence the trusted verifier obtains it from the above-mentioned trusted computer.

The untrusted computer device receives the random nonce from the verifier device, and uses the random nonce to select the instructions or the initialized $C_{m,t}$ program to execute (i.e., it selects the instructions $C_{nonce}$ from the program $C_{m,t}$ that executes instructions over the device memory M and CPU registers R (i.e., from $C_{m,t}(M, R)$. This step denotes the selection of program $C_{nonce}$ from the family of programs $C_{m,t}(M, R)$. Then the device CPU executes instructions $C_{nonce}$ over device memory M and CPU registers R and sends the result $C_{nonce}(M, R)$ back to the verifier device. After accounting for the interconnection bus delay, the verifier device measures the time it took for the $C_{nonce}$ program to execute on the untrusted computer device. If this time equals optimal time bound t, the verifier checks the correctness of the result $C_{nonce}(M, R)$ received from the system device. The verifier is trusted to obtain the correct result $C_{nonce}(M, R)$ from the execution of $C_{nonce}$ on a trusted computer, or equivalently, a trusted simulator of the trusted computer, having the same configuration as the untrusted computer device. Also, optimal time bound t may vary among different computer systems embodiments as discussed herein, and hence the trusted verifier obtains it from the above-mentioned trusted computer.

Because the $C_{m,t}$ program is second pre-image free, if the result is both timely and correct, the verifier concludes that the device state (M, R) contains all and only the chosen content, and hence RoT is established on the system device. Then the verifier records this conclusion in its memory and, in one embodiment, displays it in human-perceptible form on its display. If the response or the system is incorrect or untimely, the verifier concludes that a RoT is not established, records this conclusion in its memory and, in one embodiment, displays it in human-perceptible form.

Figure 4:
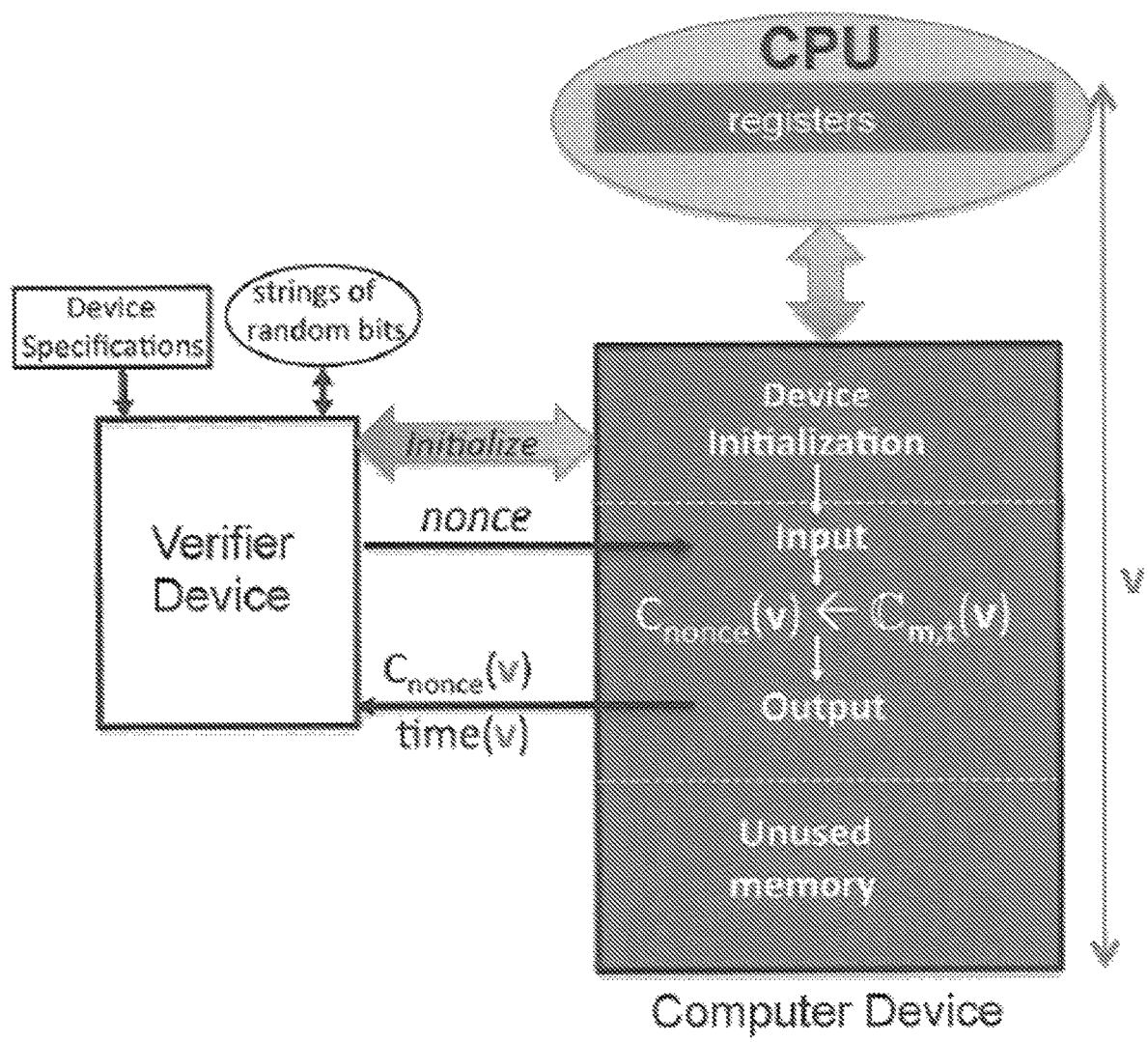
FIG. 4 illustrates one embodiment of a single computing device in which a space-time optimal computation is composed with other device programs.

FIG. 4 illustrates an embodiment of the invention whereby space-time (m-t) optimality of the $C_{m,t}$ program is preserved in the presence of, and in composition with, device initialization and input-output programs. In an embodiment of the invention, these programs are initialized by the verifier device. In another possible embodiment, these programs are initialized independently and separately from the verifier device.

In one embodiment of the invention, before the device receives the random nonce, the device initialization code sets the device's CPU special registers to certain values and then executes the input program. To receive the verifier's random nonce, the input program executes special instructions and modifies data in the device memory (e.g., its input buffers). It then passes the random nonce to the space-time optimal program $C_{m,t}$ and begins program execution as described in the embodiment of FIG. 3. After execution is complete, in one embodiment, the result $C_{nonce}(v)$ is left in a processor register and the output program sends the result to the verifier device. In another embodiment, the result is left in a memory word before it is sent to the verifier device. Furthermore, in one embodiment, the system device includes additional memory that is unused during the verifier interaction with the system device.

Those of skill in the art will recognize that a computer program $C_{m,t}$ that is space-time (m–t) optimal loses its optimality if the memory in which it executes instructions becomes larger than m or the time available for its computation is longer than t. Both of these conditions are satisfied in the embodiment of FIG. 3 where the memory size if v>m and the execution time is time(v)>t. For example, additional unused memory is available to the $C_{m,t}$ program beyond the m memory words and CPU registers. Furthermore, the additional instruction execution time for device initialization and the input and output programs may either delay the time necessary to s tart executing the $C_{m,t}$ program instructions or may speed up the execution of the $C_{m,t}$ program because additional space is available in other embodiments. In both cases, the space-time optimality of program $C_{m,t}$ would no longer enable the verifier to conclude that a RoT was established on the system device, or that the system device is malware-free. Hence, either a false positive or a false negative conclusion may be reached by the verifier. The present invention provably and unconditionally solves this problem by using a space-time optimal program $C_{m,t}$ that is also second pre-image free. Hence, the correct memory and register size v used by the verifier device equals that used in the computation of result $C_{nonce}(v)$ by the system device and returned to the verifier in new time bound tite(v). The verifier time measurement is now made against the new time bound.

Figure 5:
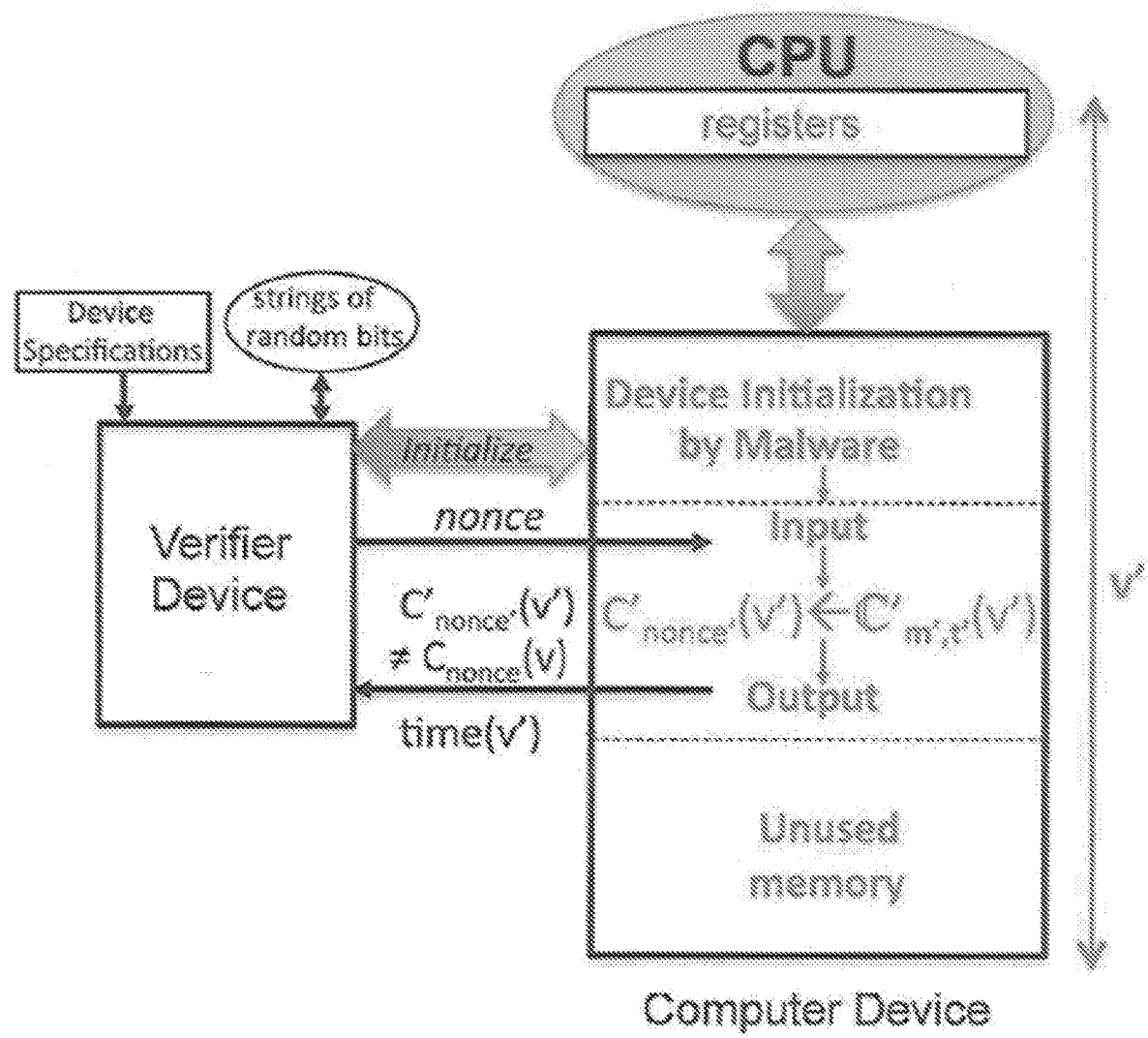
FIG. 5 illustrates an embodiment of how a single untrusted computing device can execute its own adapted and optimized code.

FIG. 5 illustrates an embodiment of the present invention whereby the initialization of a system device is performed by malware, and hence the contents of the memory and processor registers are different from the verifier's initialization. For example, adversaries take advantage of the fact that neither the verifier device nor the system's CPU's instructions can address the memories of system devices directly, and, hence, their malware survives in non-volatile device memory despite repeated power cycles and boot operations. Furthermore, in an embodiment where a system device's memory is volatile, the device can be easily re-infected by malware in other devices with which it can communicate. Malware has been found in all system devices of FIG. 1 in different embodiments.

It is well understood by those of skill in the art that the space-time optimality of program $C_{m,t}$ no longer holds after malware initializes a system device or in the presence of malware on the device. Adversarial malware can change the instructions of the $C_{m,t}$ program both before and after receiving the nonce or may simply guess the $C_{nonce}(v)$ result without executing any instructions. For example, the adversarial malware can encode a small nonce into immediate address fields of instructions to save register space and instruction execution. FIG. 5 illustrates the more insidious instance where adversarial malware changes the program instructions of the $C_{m,t}$ program and nonce to that of $C'_{m',t'}$ and nonce', where $(C'_{nonce'}, v') \ne (C_{nonce}, v)$, such that $(C'_{nonce'}, v') = (C_{nonce}, v)$ and t'<t, m'=m or t'=t, m'<m or t'<t, m'<m. If the adversarial malware outputs $(C'_{nonce'}, v') \ne (C_{nonce}, v)$ in time(v'), as illustrated in FIG. 5, it can be said that result $C_{nonce}(v)$ is unpredictable to the adversary. Otherwise, the adversary succeeds in circumventing the space-time (m–t) optimal bounds of the instructions of program $C_{m,t'}$. Adversarial malware can also circumvent the space-time (m–t) optimal bounds of the instructions of program $C_{m,t}$ whenever the nonce requires multiple input packets. Malware can pre-process input in early packet arrivals and circumvent the lower time and/or space bounds. Also, in a multi-device system, a device can perform part of the computation of another device and help the latter undetectably circumvent its optimal bounds, as illustrated herein.

The present invention provably and unconditionally solves the problem of adversarial malware circumventing optimal space-time bounds of the instructions of program $C_{m,t}$ by using a $C_{m,t}$ program that is also second pre-image free. This means that the correct memory and register size v used by the verifier corresponds to the one used in the computation of result $C_{nonce}(v)$ returned by the system device and time bound time(v).

Figure 6:
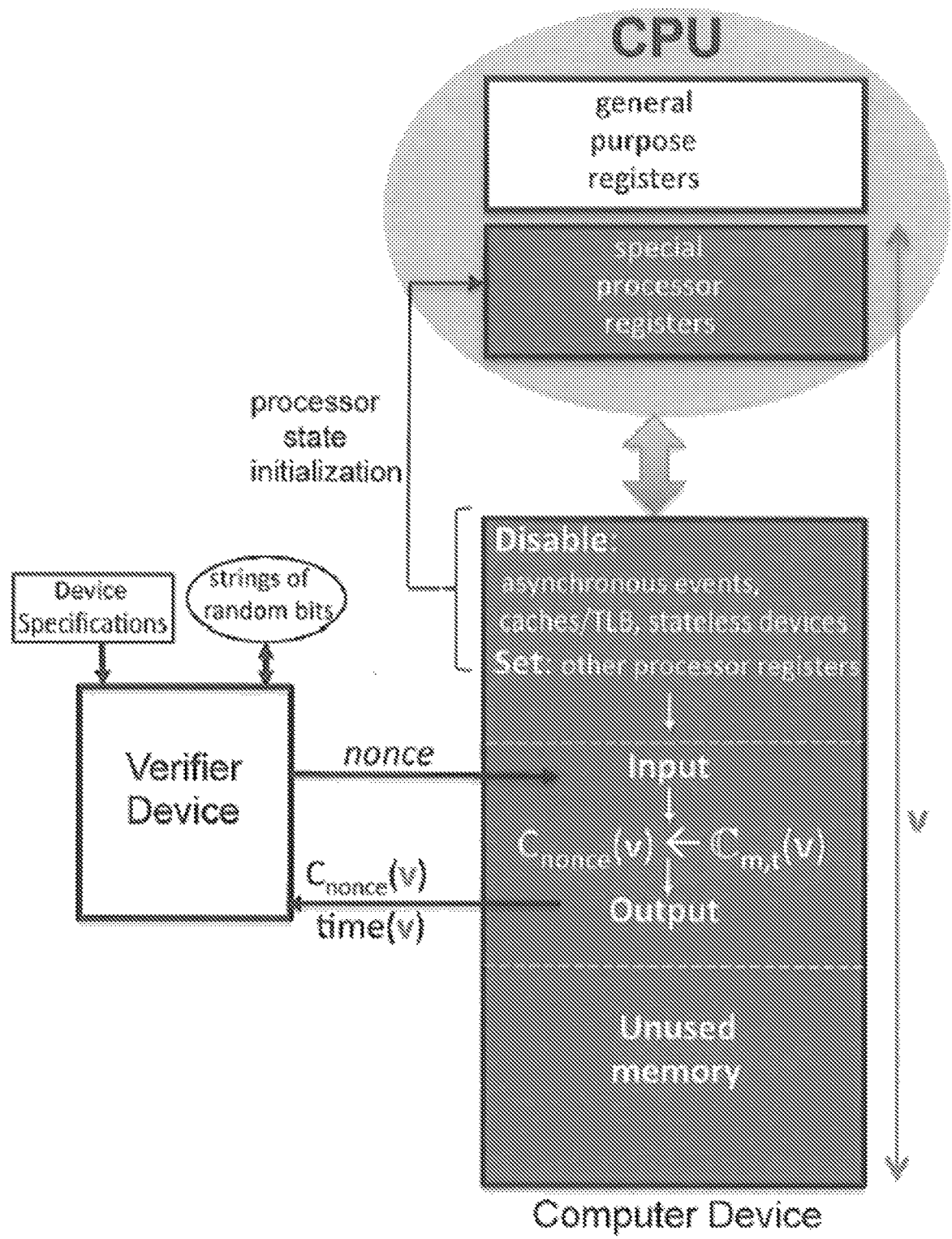
FIG. 6 illustrates an embodiment of the method according to which a single device sets processor state registers prior to executing its space-time optimal computation.

FIG. 6 illustrates an embodiment of the present invention whereby the initialized memory programs execute steps of the processor state initialization. These steps include instructions to disable all asynchronous events (e.g., interrupts, traps, breakpoints), to disable/clear caches, disable virtual memory, TLBs and to power off/disable stateless devices. The processor state initialization steps also include, and are not limited to, instructions to set the remaining state registers to verifier-chosen values (e.g., clock frequency, I/O registers). When execution ends, execution control follows with the input program.

FIG. 6 also illustrates that the timed verifier's protocol execution sequence, which establishes a RoT state on the system device, begins with the input into the device and ends when the verifier checks the device's output (i.e., result-value correctness and timeliness). This is shown between the two dashed lines in FIG. 6. The execution of processor-stale initialization instructions prior to the execution of the verifier protocol maintains the verifiable control flow across this protocol. A such, the verification of the correctness and timeliness of result $C_{nonce}(v)$ ensures that the verifier protocol is executed in an uninterrupted manner and follows the instruction sequence chosen by the verifier's initialized program on the system device. For example, processor state initialization ensures that asynchronous events, such as future-posted interrupts and hardware breakpoints on instruction execution or operand access, cannot violate control flow integrity after $C_{nonce}(v)$ code execution. Malware instructions in device initialization code can no longer post a future interrupt before the verifier's protocol begins execution, which could trigger after the correct and timely $C_{nonce}(v)$ result is returned to the verifier and corrupt the RoT state of the device.

In one embodiment of the invention, instructions that disable asynchronous events are executed before the code of the verifier's protocol begins execution. Those of skill in the art will recognize that the execution of these instructions inside the $C_{m,t}$ program would violate optimality bounds, and after $C_{m,t}$ would be ineffective: asynchronous events could trigger during the execution of the last instruction. However, the verification that any processor-state setting instruction is located before the $C_{m,t}$ program in memory (e.g., by computing digital signatures or authentication codes over the memory code) does not guarantee the instruction's execution. The adversarial malware could simply skip it before executing the $C_{m,t}$ program. To counter this malware attack, the present invention guarantees the second pre-image freedom and space-time optimality of the $C_{m,t}$ program. That is, the invention ensures that both the memory presence of an instruction that initializes the processor state (e.g., disable an event, sets other values) and the values of the processor-state bits it sets are included in the correct and timely result $C_{nonce}(v)$ received by the verifier. As illustrated in FIG. 6, both the content of the device memory, which contains the processor-state initialization instructions, and the values of the processor-state bits set are included in input v to $C_{nonce}$. This provably guarantees the instruction's correct execution before the $C_{m,t}$ program.

In another embodiment of the invention, instructions can initialize other processor state content, such as caches and TLBs, without setting of processor-state register bit values. In the present invention, the correct execution of these instructions is guaranteed by their placement in straight-line execution flow between two instructions whose execution is provably guaranteed, as already described above. In another embodiment, where the adversary computational power is bounded, the second pre-image freedom can be relaxed to second pre-image resistance.

To perform accurate and secure timing measurement, the verifier protocol eliminates cache/TLB jitter and inter-processor interference and avoids device clock jilter in long-latency computations. In one embodiment, the verifier's time measurement relies on the processor-state initialization instructions that disable caches, virtual memory, and TLBs verifiably. In another embodiment, where caches cannot be disabled, the processor-state initialization instructions clear caches verifiably, as already discussed above. As such, cache jilter is prevented in all cases.

Alternately, in other embodiments, the verifier's processor-state initialization could warm up caches by verifiable pre-fetching of memory blocks of words that fill a cache. Nevertheless, verifiable cache clearing is often required (e.g., in some processors, instruction and data caches are not hardware synchronized, and hence they have to be cleared to avoid malware retention in unsynchronized instruction caches). In some embodiments, cache anomalies may occur for some computations where a cache miss may result in a shorter execution time than a cache hit because of pipeline scheduling effects. This makes cache clearing a safer alternative.

Returning briefly to the embodiment of the present invention shown in FIG. 1, recall that the verifier is connected to a system that comprises multiple devices. Here, the verifier runs a transactional RoT establishment protocol with each individual system device, either for all i devices the $C_{nonce}(v_1)$ result correctness and timeliness verification pass or the system-wide verification fails. In addition, the verifier's protocol prevents two security problems.

First, in one embodiment, the verifier's protocol prevents a time gap between the end of the execution of $C_{m_j,t_j}$ on device j and the beginning of the execution of $C_{m_i,t_i}$ on device i, where i≠j. Otherwise, a time-of-check-to-time-of-use (TOCTTOU) problem could arise. A malicious yet-to-be-verified device could perform an unmediated peer-to-peer I/O transfer to the registers of an already verified device, corrupt its state, and then erase its I/O instructions from memory before its verification begins. Those of skill in the art will recognize that powering off all stateful devices and then powering them on individually to perform one-at-a-time verification would be inadequate because some (e.g., chipset) devices could not be powered-off without system shutdown. Furthermore, the TOCTTOU problem would still not be solved because malicious firmware instructions could still corrupt already verified devices in the time gap between device power-on and verification start. As such, in one embodiment of the invention, the verifier's RoT establishment protocols with individual system devices execute concurrently—no device may end before another starts.

Second, the verifier's protocol that establishes the RoT state for multiple devices ensures correct execution order and duration of the protocol with individual devices (e.g., of the $C_{m,t}$ programs).

Figure 7:
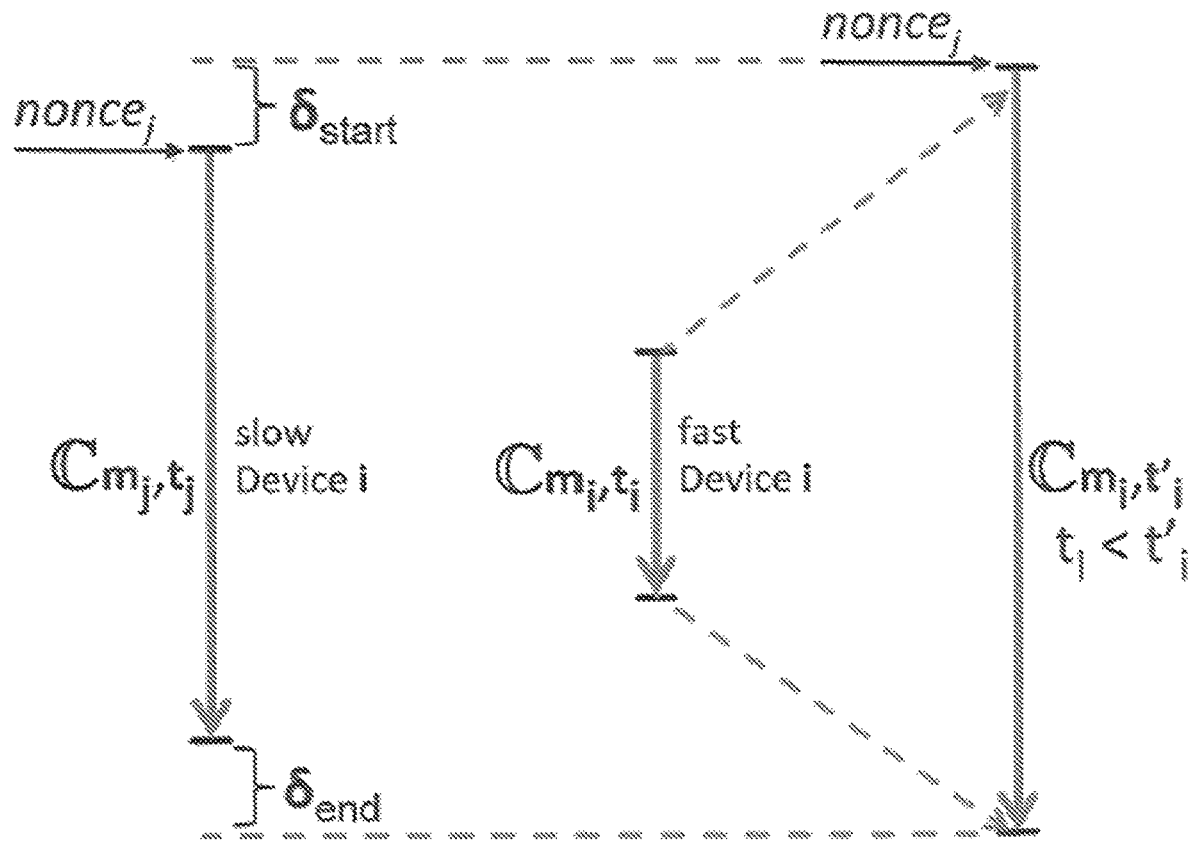
FIG. 7 illustrates an embodiment of the present invention in which one of the two instances of space-time optimal computations increases its time bound in concurrent execution.

FIG. 7 illustrates an embodiment of the present invention where the verifier's protocols run concurrently on two of the several possible system devices. The verifier initialization ensures that the difference between the start times, $\delta_{start}$ and/or end times, $\delta_{end}$, of any two programs $C_{m_i,t_i}$ and $C_{m_j,t_j}$ is small enough such that neither malware-controlled device i or j can undetectably perform any computation for the other, enabling it to lower its bounds and circumvent verification. For instance, if the verifier challenges fast device i with $nonce_i$ to start $C_{m_i,t_i}$ a lot later than slower device j to start $C_{m_j,t_j}$ with $nonce_j$, malware-controlled device i can execute some of the instructions of $C_{m_j,t_j}$ faster. Then device i can undetectably restore its correct (malware-free) $C_{m_i,t_i}$ program before its challenge $nonce_i$ arrives. Or, if $C_{m_i,t_i}$ ends well before $C_{m_j,t_j}$ ends, malware-controlled device j can act as the verifier and fool already verified device i into completing the execution of the program $C_{m_j,t_j}$ faster. (Recall that, even if verified, devices cannot securely authenticate and distinguish unverified-device requests from the verifier's requests and deny them.) Slower malware-controlled devices $C_{m_j,t_j}$ can also help faster ones surreptitiously lower the optimal space-time bounds of their $C_{m_i,t_i}$ programs.

In the embodiment illustrated in FIG. 7, the space-time optimal program $C_{m_i,t_i}$ was obtained from a space-time optimal $C_{m,t}$ program by scaling its m–t bounds to $m_i$–$t_i$ where $m_i$>m, $t_i$>t. Similarly, space-time optimal program $C_{m_j,t_j}$ was obtained from the $C_{m,t}$ program by scaling its m–t bounds to $m_j$–$t_j$ where $m_j$>m, $t_j$>t. Furthermore, FIG. 7 illustrates that, in an embodiment of the present invention, time bound $t_i$ of the space-time optimal $C_{m_i,t_i}$ program is scaled up to bound $t'_i$ of another space-time optimal program $C_{m_i,t'_i}$ where $t'_i$>$t_i$ independent of memory bound $m_i$. Those of skill in the art will understand that time-bound scaling cannot be performed by repeated invocations of $C_{m_i,t_i}$ with k≥[$m_i$/m] sequentially issued nonces. If this were implemented, the k executions $C_{nonce_0}, \ldots, C_{nonce_{k-1}}(v_i)$ would have to be linked to avoid exploitable time gaps, as described above. If linking were done by the verifier, the code of $C_{nonce_j}(v_i)$ could not end its execution until it inputs the next nonce $nonce_{j+1}$ from the verifier. Then program $C_{m_i,t_i}$ could no longer be optimal, since the variable input-synchronization delays in $C_{m_i,t_i}$ invalidate the optimal $t_i$. If system device synchronization with the verifier buffers $nonce_{j+i}$, optimal bound $m_i$ also becomes invalid. The alternate linking whereby $nonce_{j+i}=C_{nonce_j}(v_i)$ would be inadequate since nonces would no longer be random, or even pseudo-random as might be sufficient in other embodiments where the adversary is bounded.

Exemplary Embodiments

The present invention will be described in terms of several specific embodiments. These embodiments are illustrative of the present invention, but the present invention is not limited to the embodiments illustrated herein.

The present invention may be embodied in many forms. For example, the present invention may be an embedded system. In another embodiment, the present invention may be a computer system on a chip. Yet in another embodiment, the present invention may be embodied as one or more devices located in one or more parts of the invention illustrated in FIG. 1. For example, the present invention may be embodied as computer readable instructions (e.g., software on a chip, software in a portable or integrated memory device, hard-wired instructions embodied in a hardware device, or other variations). The present invention may also be embodied as computer-readable instructions (e.g., computer software, firmware, or hardware. The computer-readable instructions may be stored in memory devices which may be integrated or embedded into another device, or which may be removable and portable. Other variations and embodiments are possible.

One exemplary embodiment of the processor and memory architecture of the present invention will be described. Because an important goal is to create a concrete space-time optimal program for a processor and memory architecture, this section presents the concrete Word Random-access Machine (cWRAM), which serves as the basis for the definitions of space-time optimal programs $C_{m,t}$ and nonce definition. Different embodiments of cWRAM instructions in commercially available processors, such as those of the Intel x86, MIPS, PowerPC, and ARM series are presented to illustrate embodiments of space-time optimal $C_{m,t}$ programs and nonce according to the present invention.

Storage: The cWRAM storage includes a fixed sequence M of w-bit memory words index by an integer, such that constant w>log|M|. In one embodiment of the present invention, the allocation of each instruction in a memory word follows a typical convention of many commodity processors: the opcode in the lower-order bytes and the operands in the higher-order bytes. In other embodiments discussed herein, this convention is reversed. Furthermore, the cWRAM storage also includes r w-bit general-purpose processor registers, $R_0, R_1, \ldots, R_{r-1}$. A memory area is reserved for the memory mapped I/O registers of different devices and the interrupt vector table, which specifies the memory location of the interrupt handlers. The I/O registers include data registers, device-status registers, and device-control registers.

Special Processor Registers: In addition to the program counter (PC), the processor state includes internal registers that contain the asynchronous-event status bits which specifies whether these events are posted or are disabled (e.g., by the event clear or enable instructions). They also include a set of flags and processor configuration settings (e.g., clock frequency) and specify whether virtual memory/TLBs and caches are enabled. Instructions to enable and disable cashes/virtual memory are also included. In systems that do not automatically disable cache use when virtual memory is disabled, an internal register containing cache configuration status is provided.

Addressing: Each instruction operand is located either in a separate memory word or in the immediate-addressing fields of instructions Immediate addressing is applicable only when operands fit into some fraction of a word, which depend s on the size of the instruction set and addressing mode fields. Indirect, PC-relative, and bit addressing are also supported.

Instruction Set: The cWRAM instruction set includes all the types of integer instructions with up to two operands. However, instruction sets with higher operand counts are also possible in other embodiments. All known register initialization and transfer instructions are represented in cWRAM. They can access memory-mapped I/O registers in I/O transfers.

Register Initialization: Load immediate: $R_i:=\alpha$, or relative: $R_i:=M[PC+\alpha]$, where $\alpha$ is a constant, and direct Read: $R_i:=[R_j]$.

Register Transfer: Move: $R_i:=R_j$; Write: $M[R_i]:=R_j$.

Unconditional branches: go to g. Branch target g designates either a positive/negative offset from the current program counter, PC, and the branch-target address is PC+g, or a register $R_k$, which contains the branch-target address.

Conditional Branches: For each predicate pred: $F_{2^w} \to \{0, 1\}$, where pred $\in \{\leq, \geq, =, \neq\}$, there is an instruction pred($R_i$, $R_j$)g, which means if pred($R_i$, $R_j$)=1(true), go to PC+g. If one of the input registers, say $R_j$, contains a bit mask, there is an instruction pred($R_i$,mask)g, which means if ($R_i \wedge$mask)=0, go to PC+g. If $R_j$=0, there is an instruction pred($R_i$, $R_j$)g, which means if pred ($R_i$, 0)=1, go to PC+g. Note that the predicate set, pred, can be extended with other two-operand predicates so that all known conditional-branch instructions are represented in cWRAM.

Halt: there is an instruction that stops program execution and outputs either the result, when program accepts the input, or an error when the program does not.

Computation Instructions: Millersen's notion of computation functions is adapted and three classes of instructions are distinguished. Many other instructions can be added to the instruction set architecture of the cWRAM, However, the classes included below are sufficient for defining the space-time optimality of computation plimitives and defined herein.

Basic set: For any f: $F_{2^w} \times F_{2^w} \to F_{2^w}$, where f$\in \{\wedge, \vee, \oplus,$ logic shift$_{r/l}(R_i, \alpha)$, rotate$_r(R_i, \alpha)$, +, -$\}$, and f: $F_{2^w} \to F_{2^w}$, where f$\in$\{bitwise$\neg$\}, there is an instruction $R_h$=f($R_i$, $R_j$), $R_h$=f($R_i$, $\alpha$), and $R_h$=f($R_k$), respectively. Integers are represented in two's complement binary notation and hence are in the range $[-2^{w-1} \ldots -1, 0, 1, 2^{w-1}-1]$.

Extended set: This set includes all instructions implementing pseudo-logic instructions such as variable shift$_{r/l}$($R_i$, $R_j$) and rotate$_{r/l}$($R_i$, $R_j$) where content($R_j$)$\in$[0, w-1], are [1, w-1]-local.

Multiplication Set: This set includes all instructions. It contains instructions such as integer multiplication (i.e., mod $2^w$) and $R_i$ mod $R_j$, also known as integer division with remainder. When a $R_i$ mod $R_j$ instruction is unavailable, an optimal implementation by other cWRAM instructions exists, as defined herein. When required by a particular embodiment of the cWRAM in a real processor, the ordinary integer division without remainder instruction can be easily introduced.

All integer, logic, and shift/rotate computation instructions of real ISAs with up to two operands fall into the three sets defined above.

Instruction Execution: Once a program's instructions are stored in memory and the processor registers are initialized, the program counter register, PC, is set to the index of the memory word denoting the next instruction (i.e., program line number) to be executed. The PC is incremented at the completion of each instruction, except when (1) a conditional-branch predicate evaluates to 1; (2) an unconditional branch instruction is executed; (3) an interrupt triggers; or (4) the Halt instruction is executed. In cases (1) and (2), the PC is either offset by g or set to $R_k$, whereas in case (3) the PC is set to the first instruction of an interrupt handler.

A program in which the execution of all branching instructions precedes their targets is called a loop-free-program. A program with no branch instructions is straight-line. Let $I_1, \ldots, I_n$ be a straight-line program. A program repeat $I_1, \ldots, I_n$ until pred($R_i$, $R_j$)=0 is a loop program. Alternatively, the conditional-branch instruction is pred ($R_i$) g.

It is well-known that for any non-loop-free program, an equivalent while pred=1 do $I_1, \ldots, I_n$ end exists and its length is proportional to the original program. This obviously holds for repeat-until programs. It is also well known that, in the absence of conditional-branch instructions, the implementation of conditional branches requires at least three integer instructions A loop program implements synchronous I/O by busy waiting (e.g., if register $R_i$ selects the busy/done status bit of a device-status register and g=−1, then one-operand instruction pred($R_i$)g represents a busy waiting loop program.

Running Time: In the simplest processor embodiment, most instructions of the cWRAM have unit-time execution. However, in real processors, the $R_i$ mod $R_j$ instruction and the ordinary integer division are significantly slower than multiplications and additions. As shown herein, these differences yield different space-time optimal bounds.

The Space-Time Optimal Program $C_{m,t}$ and Nonce

As shown in FIGS. 3-6, the key primitive of the verifier interaction with a system device is the space-time optimal program $C_{m,t}$ and the nonce that selects the executable instance of that program, $C_{nonce}$, on input v. Illustrated here is an embodiment of this primitive and the construction of the nonce. Three properties of the space-time optimal $C_{m,t}$ on cWRAM that are satisfied by different embodiments in commodity processors will now be explained.

Polynomial-Based k-Independent (Almost) Universal Hash

A $C_{m,t}$ program that is second pre-image free in a one-time evaluation initiated by a verifier interaction with a system device satisfies the soundness of the verifier's result-value check. That is, no adversary can find memory or register words whose contents differ from the verifier's choice and pass its check, except with a very small probability determined by the verifier's user. Also, inputting the nonce into an untrusted device uses a small constant amount of storage rather than a variable number of packets, as already slated in the description of FIG. 5. k-independent (almost) universal hash functions based on polynomials represent only one embodiment of such $C_{m,t}$ programs. Their memory size is constant for constant k and they are second preimage free. One embodiment of the present invention defines the notion of randomized polynomials to construct (almost) universal functions for inputs of $|v|=d_1$ log p-bit memory and register words (i.e., degree d polynomials over mod p integers with k-independent, uniformly distributed coefficient.

Space-time Optimality. A $C_{m,t}$ program that is also optimal in adversary malware evaluation on a system device—not only second pre-image free—satisfies the soundness of the verifier's result-timeliness check. In one embodiment of the present invention, randomized polynomials are concretely (i.e., non-asymptotically) space-time optimal in adversary evaluations.

Scalable Optimal Bounds. According to the description of FIG. 7, a space-time optimal program $C_{m,t}$ scales both its m-t bounds jointly, and the time bound t independent of bound m. In one embodiment of the invention, the optimal memory and time bounds of the randomized polynomials are both jointly scaled by the scaling of a system constant k, which depends only on the number of available general-purpose registers. Also, by the scaling of the polynomial degree d to values greater than v-1, the time bound t scales independently of k, and hence of memory bound t.

Figure 8:
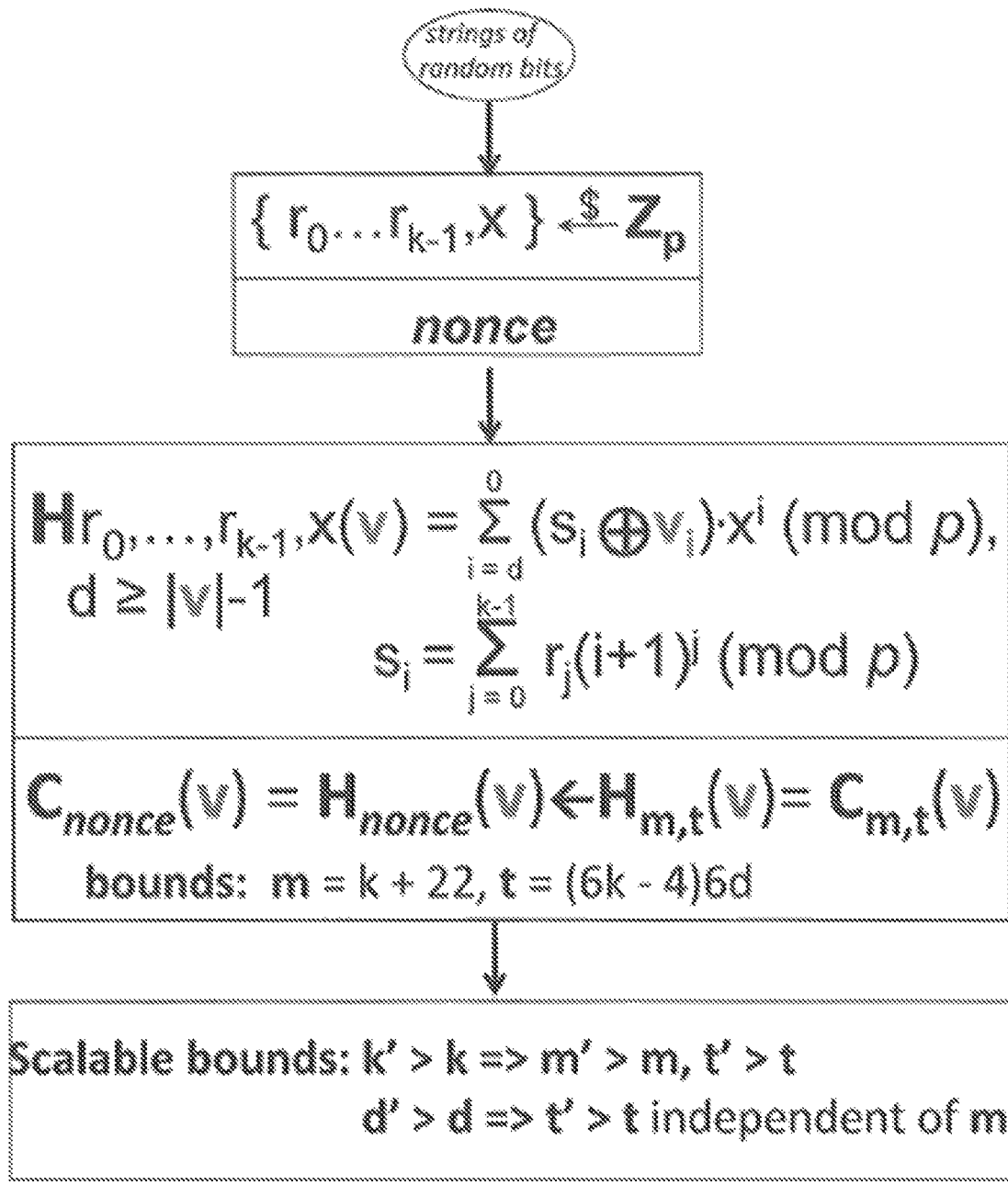
FIG. 8 illustrates an embodiment of the present invention in which an instance of the space-time optimal computation is chosen using k+1 random numbers that define a randomized polynomial of degree d.

FIG. 8 illustrates one embodiment of the present invention for a nonce comprising several random numbers generated from strings of random bits and for a $C_{m,t}$ program represented by a polynomial-based k-independent (almost) universal family of functions $H_{m,t}$ with scalable memory and Li me bounds t and t.

In one embodiment, strings of random bits are processed by the verifier device and converted into random numbers, each number comprising $\lceil \log_2 p \rceil$ bits, where p is the largest prime less than $2^w$ and w is the number of bits in a memory word or of a CPU register. Multiple variations for constructing random numbers are possible as stated in the descriptions of FIGS. 2-3. In each case the nonce includes k+1 random numbers $R_0, \ldots, R_{k-1}, x$ and indexes the family of functions $\{Hr_0 \ldots r_{k-1,x}\}$ to obtain an instance of $C_{nonce}(v) = H_{nonce}(v)$ as illustrated in FIG. 8. In one embodiment, k of these random numbers, namely $r_0, \ldots, r_{k-1}$ are the coefficients of the degree k polynomial $s_i = \Sigma_{j=0}^{k-1} r_j \times (i+1)^j$ (mod p) that are used to compute each of the d+1 coefficients $v_i \oplus s_i$ of polynomial $H_{r_0 \ldots r_{k-1,x}} = \Sigma_{i=0}^{d} x^i (v_i \oplus s_i) \pmod{p}$. It is well understood that both elements $s_i$ and coefficients $v_i \oplus s_i$ are k-independent uniformly distributed elements. It is also understood that the polynomials $H_{r_0 \ldots r_{k-1}}$ are k-independent themselves. In other embodiments of the invention, the k-independent coefficients of polynomial $\{H_{r_0 \ldots r_{k-1}}, x\}$ are generated by a variety of other instructions, not just the exclusive-or. Furthermore, there are many other embodiments of k-independent (almost) universal hash functions that can be used for $C_{m,t}(v)$ programs.

Let Horner($H_{r_0 \ldots r_{k-1,x}}(v)$) be a Horner-rule program for the evaluation of $H_{r_0 \ldots r_{k-1,x}}$ on input string v, where $|v|=d+1$. This program is also denoted by Horner($H_{nonce}(v)$) herein. In one embodiment of the present invention, the execution of Horner($H_{nonce}(v)$) on cWRAM is optimal with space bound m=k+22 words and time bound t=(6k-4)6d time units. Here, two instructions are necessary for each coefficient, $v_i \oplus s_i$, the word indexing in v is sequential and d+1<|v| (i.e, an addition instruction is required for indexing in v followed by an exclusive-or instruction). In this embodiment, Horner($H_{nonce}(v)$) uses 14 instruction words and k+8 data words. The latter comprises the degree d and nonce, namely d, $r_0, r_{k-1}, x$ followed by degree k-1, index i+1, coefficient $s_i$, modulus p, output z (which is initialized to $v_d \oplus s_d$), and $v_i$'s word index in v.

In an embodiment w here d+1>|v|, indexing in v also requires an additional mod |v| instruction. This increases both the memory and time bound but does not affect the concrete optimality of the alternate Horner-rule programs, as fewer instructions cannot perform memory addressing in cWRAM. Furthermore, in one embodiment, the indexing to access a special processor register (e.g., asynchronous event status bits) contained in v assumes that the register is mapped in physical memory. In other embodiments, accessing a special processor register by an index in v uses a couple of extra instructions. These instructions would only insignificantly increase the memory and time bounds, but not affect the optimality of the alternate Horner-rule programs.

In one embodiment of the invention where $C_{nonce}(v) = H_{nonce}(v)$, the optimal bounds are scalable in k and independently in degree d, as illustrated in FIG. 8. That is, if k'>k, then both m'>m and t'>t are true. Also, if d'>d=|v|-1, then t'>t, independent of m. This achieves the bounds scalability of the present invention in the description of FIG. 7.

The Space-Time Bounds in Commodity Processors

When implemented on commodity processor architectures, the space-time optimality of the cWRAM program Horner ($H_{nonce}(\cdot)$) on input v depends primarily on the performance of the Horner-rule steps. The optimal implementation of both the loop control and coefficient $s_i \oplus v_i$ computation is easily achieved on these processors. The Horner-rule steps are defined on unsigned integers as $z=(s_{i+1} \oplus v_{i+1}) \times x + s_i \oplus v_i \pmod{p}$, $i=d-1, \ldots, 0$ for the outer loop, and $y=r_{k-j} \times (i+1) + r_{k-j-i} \pmod{p}$ for the inner loop. Hence, the present invention illustrates several embodiments of the Horner-rule steps in different commodity processors, which are illustrative of the present invention. However, the present invention is not limited in any way to the embodiments illustrated herein, and certainly not limited to commodity processors.

Division-based Implementations. As in c WRAM, the mod p implementation of Horner-rule steps avoids all register carries. In practice, many commodity processors include the mod instruction (e.g., Intel x86, AMO, MIPS, IBM PowerPC, SPARC V8 (with special output register), RISC V (with fused division with remainder), among others). Lower-end processors include only the ordinary integer division-without-remainder (e.g., ARM Cortex A15 and above and the M3-M4 and R4-R7 series). In the lower-end cases, the mod instruction is typically implemented by two instructions: an integer division followed by a three-operand multiply-and-subtract operation. In other embodiments, where the processors are limited to two-operand instructions, the mod instruction is implemented by three instructions as the multiply-and-subtract uses two instructions. As in the cWRAM embodiment, these implementations lower the memory bounds.

The cWRAM embodiment of the mod instruction has unit cost like all others. However, in other processor embodiments, the mod instruction is more expensive than other instructions, such as multiplication or addition in terms of both execution time and energy use. In fact, low-end processors, which are often used in micro-controllers and other embedded systems, lack even ordinary integer division-without-remainder not just mod, due to its higher execution time (e.g., in ARM Cortex AS, A8, A9). Here, the ordinary integer division by constant p is implemented by inexpensive instructions, such as a multiplication and a shift. In different embodiments, computing the Horner-rule steps, all division instructions, not just the mod, are avoided. As a consequence, different space-time optimal bounds for Horner($H_{r_0 \ldots r_{k-1},x}(v)$) arise in different embodiments of the present invention.

Division-less Implementation. A Horner-rule step is implemented by an integer multiplication and two additions, each of which is reduced mod p by two instructions. Register carries are either handled by single conditional additions or avoided by judicious choice of x, as follows.

Let p denote the largest prime that fits into a w-bit word. The first Horner-rule step z can be expressed as $z=a_{i+c} \cdot x + a_i \pmod{p}$, where $a_{i+a}=s_{i+1} \oplus v_{i+1}$ for $i=d-1, \ldots, 0$. Let the product $a_{i+a} \cdot x$ be implemented by an unsigned-integer multiplication instruction with double word output in registers $R_{Hi}$ and $R_{Lo}$ and $p=2^w - b$, where p is the highest prime that fits in a w-bit word. Then $z=a_{i+a} \cdot x+a_i \pmod{p}=R_{Hi} \cdot 2^w+R_{Lo}+a_i \pmod{p}=b \cdot R_{Hi}+R_{Lo}+a_i$ since $2^w=b \pmod{p}$. Next, the register carries caused by additions are handled by conditional additions of the unaccounted for $2^w$ to z (i.e. $z+2^w=z+b \pmod{p}$). Equivalently, reduce z(mod P): $z-p=z-(2^w-b)=z+b \pmod{p}$. In contrast, the register carry in the integer multiplication $b \cdot R_{Hi}$ is avoided by picking $$x \le \left\lfloor \frac{2^w}{b} \right\rfloor$$

at the cost of a negligibly higher collision probability. The register carries of the second Horner-rule step, y above, is implemented in a similar way as for z.

In one embodiment of the present invention, the final reduction of the randomized-polynomial output, z(mod p), comprises the test z>p and the conditional subtraction by p, since register carries are already handled. The conditional test is implemented by a single three-operand instruction. In other embodiments, in which only two-operand instructions are supported, the conditional test is implemented by two instructions. The final y(mod p) reduction is performed at the end of each $S_i$ evaluation.

In yet another embodiment of the invention, for the word width w=64 and $p=2^{61}-1 < t \ 2^w$, the reduction of z when $p<z<2^{64}$ is preformed by writing $z=a \cdot 2^{61}+b(\text{todtp})$, where $0 \le a$, $b \le 2^{61}$. Hence, $z=(z\text{tdivt}2^{61})+(z\text{ttodts}^{61})$. The integer division operation div, requires a right shift instruction, and mod requires a bitwise and instruction with the mask $2^{61}-1$, which requires a third instruction.

It is known that an implementation of the Horner-rule step in only eight instructions (without counting the final modular reduction) for w=32 and $p=2^{35}-5$ is available for an Intel x86-32 class processor. A MIPS processor requires two additional move instructions, since its $R_{Hi}$ and $R_{Lo}$ registers are not directly addressable. These programs far exceed the four-instruction cWRAM implementation, which nevertheless increases the measured time bound in some commodity processor embodiments.

The time bound of division-less implementations intimately depends on the type of arithmetic for a given word size. A CPU performing w-bit arithmetic on 2w-bit words uses many more instructions to implement the Horner-rule step than a CPU performing w-bit arithmetic (e.g., an efficient forty-instruction implementation exists for a 32-bit CPU operating on 64-bit words ($p=2^{64}-59$), and another one for 64-bit CPU arithmetic for 128-bit words ($p=2^{127}-1$)).

Optimal Space-Time Choice. Eliminating both the mod and ordinary integer division instructions in real processor implementations yields lower time bounds and higher space bounds for evaluations of a Horner-rule step. In fact, there exist multiple space-time optimal bounds on a single processor ISA. For example, some space-time optimal programs are obtained when the mod instruction (with or without direct access to the remainder register) is used. Others are obtained when a division-less implementation is used, and yet another category arises when different combinations of addressing modes, word and register sizes are used. Every distinct space-time optimal implementation has a different program encoding for the Horner-rule program and hence a different input v to the Horner ($H_{nonce}(v)$) program. Hence, the second pre-image freedom of t Horner ($H_{nonce}(v)$) programs implies that neither implementation yields a higher chance of adversary success in establishing malware-free states.

In some embodiments of the invention, space-time optimal implementations that minimize the time bound are preferable in devices with large primary memories where randomized-polynomial evaluations may take up to a few minutes for very large k. For example, to minimize the time bound of a division-less implementation of the optimal Horner-rule step for a specific processor model and ISA instance, one can use a stochastic superoptimization technique designed for short, loop-free, fixed-point instructions. When given this target implementation and the minimum time as the optimization criterion, a superoptimizer produces the time-optimized minimum-space program for that processor and model (e.g., the STOKE tool use for the Intel x86-64 ISA, which is generally considered to be the most complex instance of a CISC architecture).

Choosing k General Purpose Registers. The space-time optimality/of the Horner ($H_{r_0 \ldots r_{k-1},x}(v)$) program on commodity processor architectures also depends on the number of general purpose registers available to hold the k random k−1 numbers for computing $s_i = \Sigma_{j=0}^{k-1} r_j \chi(i+1)^j \pmod{p}$. The k random numbers are input and initialized in a processor's general purpose registers as part of the k+8 data words, which are determined by the memory lower bound of Horner ($H_{r_0 \ldots r_{k-1},x}(v)$). Different embodiments of the present invention illustrate the choice of value for k in commodity processors' architectures.

One such embodiment shows that typical ARM processors have sixteen general purpose registers per mode, including the PC register. Additional registers exist for dedicated use in privileged mode and floating-point instructions, and none of these can be used to bypass optimal bounds for randomized polynomial evaluation. Of the fifteen general purpose registers available for division-less evaluation, two are used for the output of integer multiplication, one of which is unaccounted for among the k+8 data words used in randomized polynomial evaluation in cWRAM. Hence, at most fourteen registers hold the k+8 data words, and thus k is at most six.

In MIPS I processor embodiments, there are thirty-two general purpose registers, of which one is the source of constant zero and the other is the extra register unaccounted for in the output of integer multiplication. Since at most k+8 resisters are required for randomized polynomial evaluations, k is at most twenty-two. The other thirty-two registers are dedicated to floating point instructions and are unusable for randomized polynomial evaluation, since they slow down latency-bound integer computations, like the Horner-rule step, considerably.

In other embodiments, such as those on Intel's x86-32 processors, fewer than eight general purpose registers are available. In this case, the k random values are allocated to these registers and the rest of k+8 data values, which are required by randomized polynomial evaluation in cWRAM, are allocated to the memory area. This is done because coefficient evaluations based on the k random numbers and the Horner-rule step are essential to optimal evaluations. Here, the value of k is less than eight; e.g., four. A higher value for k is expected for Intel's x86-64 processors where more GPR registers are available. However, similar considerations apply.

Figure 9:
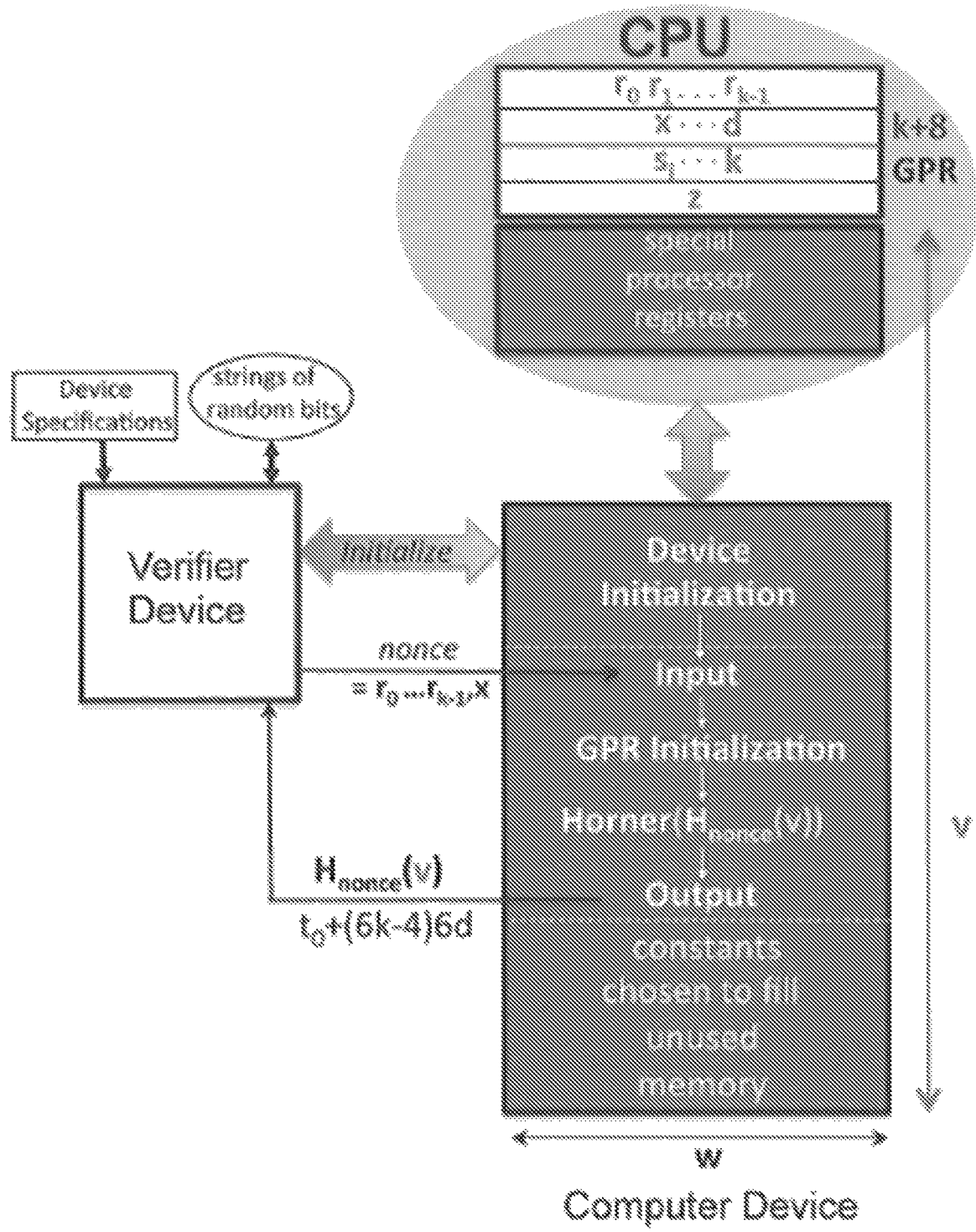
FIG. 9 illustrates an embodiment of the present invention in which the verifier interacts with a single system device using a specific space-time optimal program after device initialization.

FIG. 9 illustrates one embodiment of the present invention in which the verifier-initialized device memory includes the choice of space-time optimal program Horner ($H_{r_0 \ldots r_{k-1}, x}(v)$) Horner($H_{nonce}(v)$)) described in FIG. 8. The verifier-device interaction includes a step in which the verifier device sends an initialization signal to the system device whereby the system device executes the instructions of a program that performs device initialization. As illustrated in FIG. 5, the device initialization steps may not contain all and only the verifier's chosen initialization programs, and, hence, are untrusted (e.g., they may contain adversary malware). In one embodiment, the system device performs its memory initialization step after device boot, and this step includes, but is not limited to, steps (i)-(v) below.

i) Processor-state initialization. In one cWRAM embodiment illustrated in FIG. 6, this is a straight-line program that accesses special processor registers to (1) disable asynchronous events (e.g., interrupts, traps, breakpoints); (2) disable/clear caches and disable virtual memory, TLBs, when available. Disabling/clearing caches/TLBs prevents an adversary from loading chosen content before the limed verifier's protocol starts and circumventing time measurements. Also, stateless devices are powered off when these programs execute their instructions; and (3) set all remaining state registers to chosen values (e.g. clock frequency, I/O registers, etc.). When execution ends, the input program initialization follows in straight line, as illustrated in FIG. 9.

ii) Input program initialization. In one cWRAM embodiment, the input program comprises instructions that busy-wait on the verifier's channel device for input. Then, the general-purpose registers (GPR) initialization program follows in straight line, as illustrated in FIG. 9.

iii) GPR Initialization program. In one cWRAM embodiment, this is a straight-line program that loads the nonce $r_0, \ldots, r_{k-1}, x$ that selects $H_{nonce}(\cdot)$ into the general-purpose processor registers so that no register is left unused (e.g., if 16 registers are available, k=16). If there are any remaining GPR registers, these are filled with the remaining words of the k+8 data words of the optimal memory bound. Otherwise, the remaining data words are initialized in program memory. The execution time of GPR initialization time, $t_0$, is constant, since k+8 is a device constant. When the initialization ends, the Horner($H_{nonce}(v)$) program initialization follows in straight line.

iv) Horner($H_{nonce}(v)$) program initialization. In one cWRAM embodiment, the Horner($H_{nonce}(v)$) program, which includes 14 instructions, is initialized. When this program executes, its instructions follow the GPR initialization. When the initialization of the Horner ($H_{nonce}(v)$) program ends, the output program is initialized in memory. This program includes instructions that send result $H_{nonce}(v)$ to the verifier, as illustrated in FIG. 9. Then, the instructions of this program return to busy-waiting in the boot loader for further verifier input.

r) Unused-memory initialization. In one embodiment, after the initialization steps (i)-(iv) are performed, the rest of the device memory M is filled with the verifier's choice of constants.

After the device-memory initialization steps (i)-(v) are completed, the system device executes the processor-state initialization program as described in FIGS. 4-6. When this program completes execution, the input program is executed. After the input program completes execution, the timed phase of the verifier's protocol on the system device begins with the transfer of control to the GPR initialization program. Upon completion, the GPR initialization program transfers control to the Horner($H_{nonce}(v)$) program. When the execution of the Horner($H_{nonce}(v)$) program ends, it outputs result $H_{nonce}(v)$ in $t_0+(6k-4)6d$ time units on cWRAM. The output program follows in straight line and completes the verifier's protocol, as illustrated in FIG. 9. When the verifier device receives the output from the system device it checks the result correctness and timeliness, records its conclusion, and possibly displays it in a human-perceptible form on its display, as described in FIGS. 3, 4 and 6. If the result received from the system device is correct and timely, the verifier concludes that the system device is malware free. Otherwise, it concludes that unaccounted for content (e.g., malware) exists in the system device.

In one embodiment of the present invention, the GPR contain w-bit representations of the k+8 random numbers. However, the memory and special processor registers of a system device comprise w-bit words, rather than the log p-bit fields, where $p<2^w-1$ is the largest prime. Hence, a sliver of unaccounted for content exists in this embodiment. To complete RoT establishment after the verifier device establishes that the device is malware free, the verifier loads an ordinary word-oriented (almost) universal hash function in the malware-free device memory and verifies the results they return after application to memory and special processor register content. The space-time optimality of these hash functions is unnecessary in this embodiment, since malware-freedom is already established. A pairwise verifier-system device$_i$ protocol checking device memory and special register content is sufficient.

In one embodiment of the present invention, prime p was chosen to be the largest prime that fits into a word of w-bits. This implies that some of the values of the word-aligned instruction strings could not fit into mod p integers, unlike the verifier-chosen constants which fill the unused memory. However, the shorter (op code, single-operand) pairs both fit into these integers and align with the least significant bits of a word in cWRAM. Furthermore, the cWRAM encoding of the sequence of (opcode, single-operand) pairs of the verifier-chosen instructions is unique. Hence, the mapping from the unique sequence of verifier-chosen word (e.g., instruction) strings to a unique sequence of mod p integer strings in v is preserved without any additional memory initialization action in the device-memory initialization steps already described. Although this mapping implies the establishment of malware-free states before from the RoT, this separation is beneficial in many embodiments. For example, in an on-demand I/O channel isolation, a verified malware-free application needs to establish only that the controller of its newly allocated device, which is taken from a malware-infested operating system is, in fact, malware-free. Requiring RoT establishment for the entire multi-device system would be unnecessary in this embodiment.

Aligned Instruction Encodings. In some embodiments in commodity processor architectures, such as the Intel x86 processors and their successors, the cWRAM alignment of the (opcode, single-operand) pairs with the least significant bits of a word is maintained. However, in other processors, such as MIPS and ARM, it is not. The (conditional) opcode, addressing mode, and operands specifications are aligned with the most significant bits, so that part of the unique opcode encodings may be chopped off in mod p integer computations. For example, if w=64 and p=$2^{64}$-59, then some of the least significant six bits may be chopped off and the sequence of (opcode, single-operand) pairs may no longer be unique. In such cases, the uniqueness of this sequence can be easily restored at the cost of a single additional instruction execution during the evaluation of coefficients $s_i \oplus v_i$ without affecting the optimality of the Horner ($H_{nonce}(v)$) program. That is, the processor register which contains $v_i$ is either reversed (e.g., by executing a RBIT instruction in ARM processors), or appropriately rotated/shifted (e.g., as in MIPS processors). The endianness of the instruction and data sequences in memory remains unaffected in any case.

Alignment-Free Instruction Encodings. Alignment-free encodings of instruction words into mod p integers can be supported whenever an additional unique word-string to integer-string mapping is performed during device initialization. Thus, the second pass with an ordinary word-oriented (almost) universal hash function can be avoided in some embodiments of the present invention. Performing such an additional mapping is always possible. For example, the ordered upper-half words of the verifier's choice of programs, which would be truncated in mod p integer computations, could be replicated in the ordered lower-half words of memory following those programs, during initialization. This transforms the distinct verifier's choice of program initialization into another distinct initialization that leaves the verifier's programs unchanged, and hence able to execute instructions. This is almost always possible in practice since the memory size far exceeds the size of all programs in memory and does not increase the optimal time bounds.

Alternate embodiments of the unique mappings of out-of-range words in the verifier's choice of programs must not change the original program-instruction encodings in memory. For this reason, transforming word strings into mod p integer strings requires additional processing of instruction words in extra processor registers, and hence new space-time bounds determination, before use in a Horner-rule program.

The verifier device and system device steps described for FIG. 9 are repeated for each system device in a multi-device embodiment, as already described in FIGS. 1 and 7.

Figure 10:
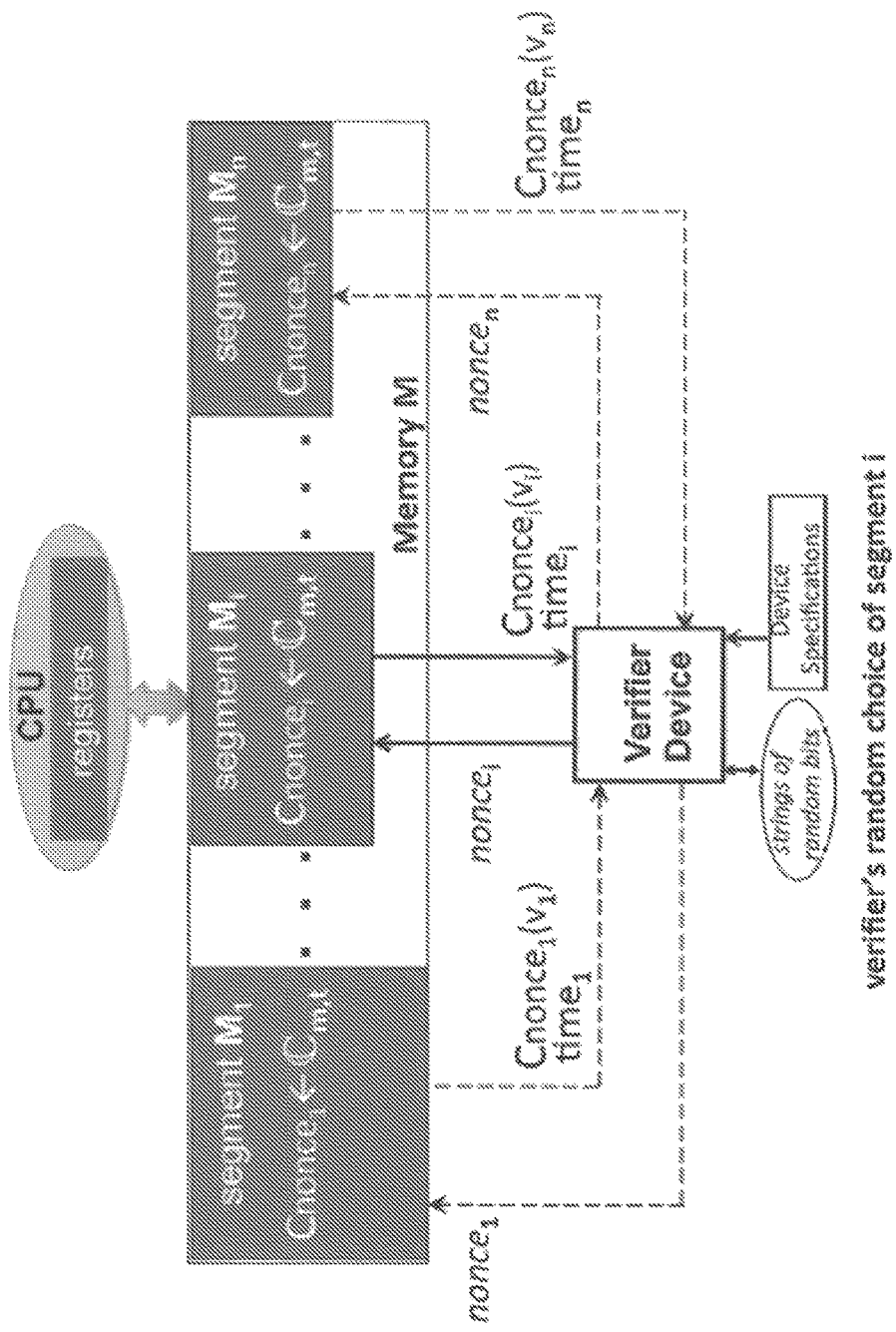
FIG. 10 illustrates an embodiment of the present invention where a processor executes a separate space-time optimal computation in different memory areas selected at random by the verifier.

FIG. 10 illustrates one embodiment of the process according to the present invention that is performed to address cases when the Horner($H_{nonce}(v)$) program executes its instructions in large memory systems (e.g., when v is large). In some embodiments the uninterrupted execution of Horner ($H_{nonce}(v)$) may have large latencies (i.e., several minutes), and the verifier may experience small time-measurement variations in some systems due to uncorrected random clock jitter at high frequencies. In such cases, the accuracy of the verifier's time measurements may diminish. For such systems, the present invention uses a random sequential memory segment verification which leverages smaller memory segments and the verifiable choice of low-frequency clock setting, such that uncorrected clock jitter becomes unmeasurable by an adversary and cannot be exploited by adversary malware.

Note that the size of the segments shown in FIG. 10 can vary. Memory M can be initialized with segments that are small enough such that their evaluation time becomes smaller than the round-trip time necessary for a remote proxy attack, where the remote proxy is powerful enough to evaluate any randomized polynomial in nearly zero time. Hence, if malware attempts to enlist the help of an adversary of unbounded power to bypass the optimal space-time bounds of all the small memory segments, the verifier protocol fails the time check performed by the verifier.

In random sequential memory segment verification, the verifier performs the memory initialization by requesting the system device to perform memory initialization of n memory segments, each of which is initialized as described in FIG. 9. Then the device initialization program transfers control to the first instructions of the processor-initialization program of the randomly selected memory segment by the verifier. In one embodiment, the verifier's output program is initialized to a new set of instructions that return to the busy-waiting input program after outputting a result. Furthermore, busy-waiting input program is initialized to a new set of instructions that transfer control to the first instruction of the input code of the next randomly chosen segment by the verifier. This may be its own first instruction if the verifier chooses its segment. The address of the next segment's input code is provided by the verifier along with the nonce of the next randomly chosen memory segment, which then executes its $H_{nonce}(v)$.

As those of skill in the art will recognize, a non-random selection of the next memory segment to be verified enables adversary malware to take control of the system after a correct and timely result is returned by a memory segment evaluation, to modify the memory of an already evaluated segment, and then to overwrite itself with correct evaluation code before the next nonce input arrives from the verifier. It is also well known that for an n-segment memory system where the choices of segment verification is random, the verifier has to make n·log$_2$tn choices to ensure that the entire memory system is verified with very high probability.

Other alternate embodiments exist for the memory initialization in different segments (e.g., some memory segments may have equal number of w-bit memory words). In other embodiments, the word sizes may differ, in which case the verifier selects different values of the largest prime number p that fits into each word size. Yet in another embodiment the verifier's protocol also provides an alternate type of memory bound scaling. For example, in controller devices can complete verification concurrently with the first memory segments with-out having to scale their space-time optimal computations to meet the large time bound of a primary memory verification.

Figure 11:
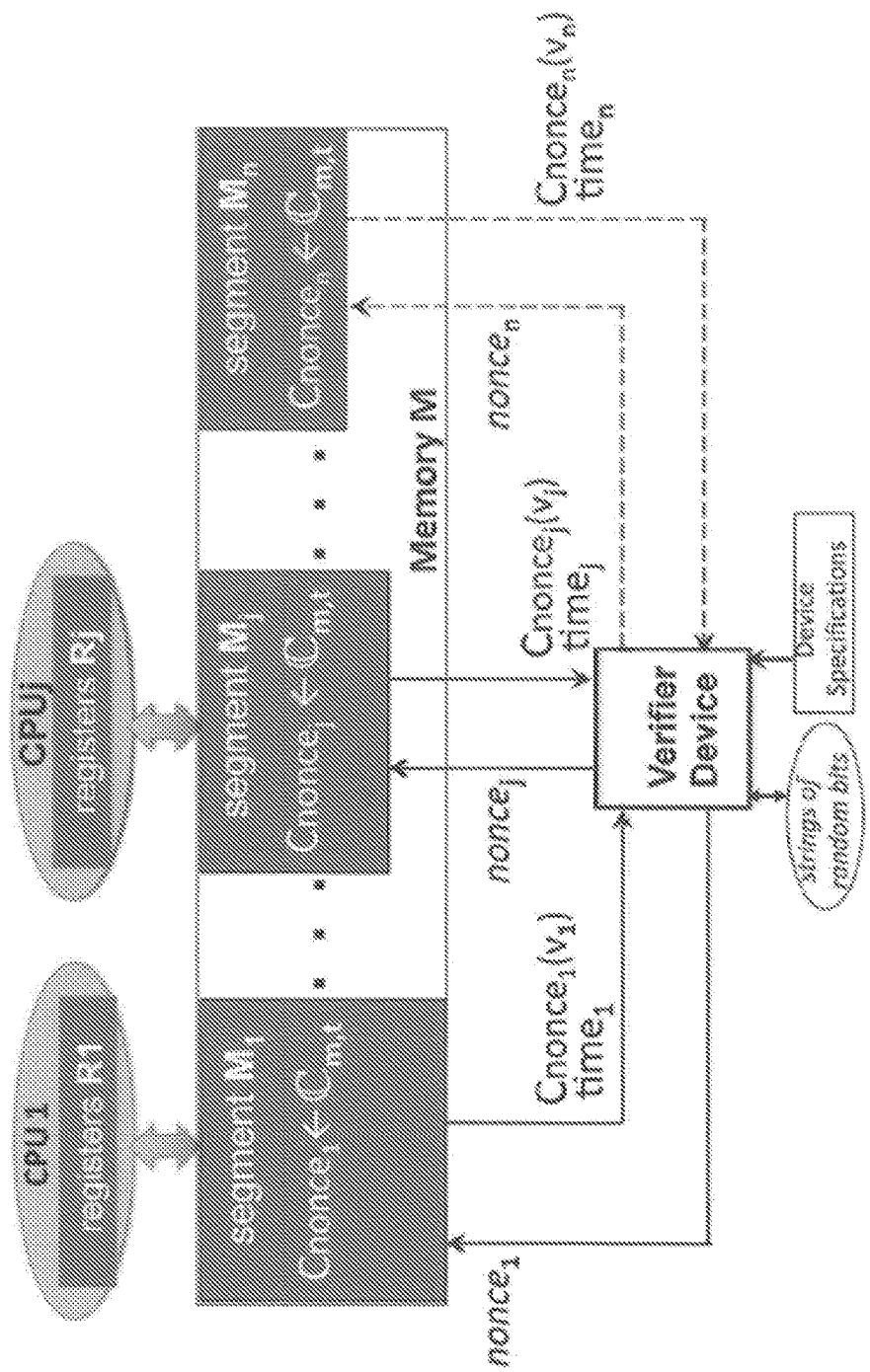
FIG. 11 illustrates an embodiment of the present invention with a multiprocessor system where each processor addresses a different memory area while evaluating its specific space-time optimal computation.

FIG. 11 illustrates one embodiment of the process according to the present invention that is performed to address the potential interference in concurrent memory addressing by multiple processors (or cores) of the same system device, when the Horner($H_{nonce}(v)$) program executes its instructions. In another embodiment, the processors are different (e.g., have different instruction set architectures and speeds). In a multiprocessor device, where n processors share a device memory, M, the device memory is segmented into multiple memory segments, each of which is separately initialized by separate processor register and memory initializations according to FIGS. 6-9. In yet another embodiment, the number of memory segments i exceeds that of the processors n (n>j). The assignment of segments to processors can be done by selecting j segments at random without replacement from the n segments. Thus, no two processors or more can access the same segment at the same time. This ensures that any potential interference in memory addressing is eliminated. Hence, a verifier's timing measurements are accurate in such embodiments.

Although the present invention has generally been described in terms of specific embodiments and implementations, the present invention is applicable to other methods, apparatuses, systems, and technologies. The examples provided herein are illustrative and not limiting, and other variations and modifications of the present invention are possible and contemplated. Those and other variations and modifications of the present invention are possible and contemplated, and it is intended that the foregoing specification and the following claims cover such modifications and variations.

We claim:

1. A method for establishing a local software root of trust on an untrusted computing device in an unknown state, comprising: sending chosen content to the untrusted computing device, the chosen content including data and executable code; receiving an indication from the untrusted computing device indicating that the untrusted computing device was initialized to the chosen content; sending a nonce to the untrusted computing device; receiving a result of the execution of a portion of the executable code from the untrusted computing device, the portion of the executable code being selected for execution as a function of the nonce and being executed as a function of the data; determining that the result has been received from the untrusted computing device within a maximum time from the sending of the nonce; comparing the result to a known correct result; and verifying a local software root of trust on the untrusted computing device if the result is correct and has been received within the maximum time.

2. The method of claim 1, the executable code including a family of space-time optimal, second pre-image free computations.

3. The method of claim 2, the untrusted computing device having memory M and register set R, further comprising:
   initializing memory M and register set R with the chosen content; and
   executing the selected computation using memory M and register set R as inputs to the selected computation.

4. The method of claim 3 wherein one or more of the registers of register set R have as contents all or part of the nonce.

5. The method of claim 4 wherein one or more of the registers of register set R have as contents data words from the chosen content which are used by the selected computation.

6. The method of claim 5, the chosen content comprising executable code to load the content of registers in register set R.

7. The method of claim 2, the family of space-time optimal, second pre-image free computations comprising a k-independent hash function family, wherein the nonce sent to the untrusted computing device selects a function of the k-independent hash function family.

8. The method of claim 7, the k-independent hash function family implemented by a family of randomized polynomials where k+1 random numbers representing the nonce sent to the untrusted computing device selects a polynomial of the family, and wherein k is determined based on the available general-purpose processor registers of the untrusted computing device.

9. The method of claim 1 further comprising:
   receiving a random number; and
   using the random number as the nonce.

10. The method of claim 2 further comprising:
    receiving a specification of the untrusted computing device; and
    choosing the chosen content based on the specification.

11. The method of claim 2, the chosen content comprising executable code for:
    initializing processor state registers of the untrusted computing device;
    disabling all asynchronous events, interrupts, traps or breakpoints on the untrusted computing device;
    disabling or clearing all caches on the untrusted computing device; and
    disabling any virtual memory on the untrusted computing device.

12. The method of claim 11, the chosen content comprising executable code for:
    initializing any remaining processor state registers of each untrusted computing device, including those for setting clock frequency and input-output registers of the untrusted computing device.

13. The method of claim 11, the chosen content comprising programs for:
    initializing any input and output programs on each untrusted computing device.

14. The method of claim 1 further comprising:
    initializing the portion of the executable code selected for execution; and
    initializing any unused memory of the untrusted computing device using the data from the chosen content.

15. The method of claim 12, further comprising:
    scaling memory size and time bounds of the portion of the executable code selected for execution based on the specification of the untrusted computing device, the specification including the processor state registers, register set and memory specifications.

16. The method of claim 3, the memory M of the untrusting computing device partitioned into a plurality of segments, further comprising:
    providing a copy of the family of space-time optimal, second pre-image free computations for each memory segment; and
    selecting one or more memory segments in which to execute the selected computation based on the nonce.

17. The method of claim 16, a segment of memory M further comprising executable code to perform the functions of:
    disabling all asynchronous events and set processor state registers to on the untrusted computing device to data contained in the chosen content;
    receiving the nonce for the segment in a single input transfer having a known time duration;
    initializing the general-purpose processor registers to the random numbers representing the nonce received for the segment and the remaining general-purpose processor registers to data words used by the instructions of the selected computation initialized in the segment;
    executing the selected computation; and
    outputting the computation result.

18. A trusted verifier device comprising:
a processor; and
memory containing instructions implementing the method of claim 16.

19. The verifier device of claim 18, the verifier device in communication with the untrusted computing device directly through a common system bus, the verifier having the ability to read and write system memory and registers of the untrusted computing device.

20. The verifier device of claim 19, the verifier device providing a human perceptible indication of whether the result from each segment of memory M is correct and whether the computation of each result has taken not exceeded the maximum time from the sending of the nonce.

\* \* \* \* \*